United States Patent

Hamagishi et al.

[11] Patent Number: 6,040,807
[45] Date of Patent: Mar. 21, 2000

[54] THREE-DIMENSIONAL DISPLAY

[75] Inventors: Goro Hamagishi, Toyonaka; Keiichi Kanatani, Hirakata; Shunichi Kishimoto, Kaizuka; Masahiro Sakata, Hirakata; Atsuhiro Yamashita, Osaka; Naoki Matsushita, Hirakata; Ken Mashitani, Nara-ken, all of Japan

[73] Assignee: Sanyo Electric Co., Ltd., Osaka-fu, Japan

[21] Appl. No.: 08/987,140

[22] Filed: Dec. 8, 1997

Related U.S. Application Data

[63] Continuation of application No. 08/340,392, Nov. 15, 1994, abandoned.

[30] Foreign Application Priority Data

Nov. 15, 1993 [JP] Japan .................................. 5-284810
Apr. 27, 1994 [JP] Japan .................................. 6-89859
Aug. 19, 1994 [JP] Japan .................................. 6-195299

[51] Int. Cl.$^7$ ..................................................... G09G 5/00
[52] U.S. Cl. ................................... 345/6; 345/7; 348/51; 348/54; 348/56; 359/462
[58] Field of Search ................................. 345/139, 6, 7, 345/8; 348/42, 51–60; 359/462, 475

[56] References Cited

U.S. PATENT DOCUMENTS 1,882,424  10/1932  Ives .
4,424,529   1/1984  Roese et al. .
4,829,365   5/1989  Eichenlaub .
5,283,563   2/1994  Allen et al. .
5,315,377   5/1994  Isono et al. .

OTHER PUBLICATIONS

Proceedings of SPIE Conference, vol. 1669, Feb. 1992, "50–inch Autostereoscopic Full–Color–3–D TV Display System".

NHK Laboratories Note, NHK Science and Technical Research Laboratories, Serial No. 398, Dec. 1991, Ilssn 0027–657X, "Autostereoscopic 3–D Television Display".

SPIE vol. 1915 Stereoscopic Displays and Applications IV (1993), pp. 177–186, "Developments in Autostereoscopic Technology at Dimension Technologies Inc." Jesse B. Eichenlaub, Dimension Technologies Inc., Rochester, New York 14611.

Primary Examiner—Bipin Shalwala
Assistant Examiner—Kent Chang
Attorney, Agent, or Firm—Nikaido Marmelstein Murray & Oram LLP

[57] ABSTRACT

A three-dimensional display comprising a flat light source, a vertical striped filter having slits transmitting light from the light source and barriers screening the light from the light source alternately formed therein for partially transmitting the light from the light source, and an LCD panel arranged on the light emission side of the vertical striped filter and having left eye pixels and right eye pixels alternately formed therein, light passing through the left eye pixels in the LCD panel and light passing through the right eye pixels being emitted toward a observer in a separated state.

9 Claims, 25 Drawing Sheets

THREE-DIMENSIONAL DISPLAY

This is a continuation of application Ser. No. 08/340,392, filed Nov, 15, 1994, now abandoned.

BACKGROUND OF THE INVENTION

1. Field of the Invention

The present invention relates to a three-dimensional (3-D) display capable of viewing three-dimensional images without using special glasses.

2. Description of the Prior Art

As a method of displaying three-dimensional images without using glasses, a lenticular method and a parallax barrier method have been conventionally proposed.

The parallax barrier method is a method in which a parallax barrier comprising slits is arranged short of a display screen to cause parallax, to obtain three-dimensional images. FIG. 34 is a structural drawing for explaining the principle of a conventional 3-D display by a parallax barrier method.

Left eye pixels L having left eye image information and right eye pixels R having right eye image information are alternately formed horizontally in a display screen 200. A parallax barrier plate 300 having slits 300a transmitting light from the pixels L and R and barriers 300b screening the light alternately formed in a slit shape horizontally therein is arranged ahead of the display screen 200.

A light beam L1 directed toward the left eye EL of a observer out of light beams emitted from the left eye pixel L passes through the slit 300a, to reach the left eye EL, while a light beam L2 directed toward the right eye ER of the observer is screened by the barrier 300b. Further, a light beam R1 directed toward the right eye ER of the observer out of light beams emitted from the right eye pixel R passes through the slit 300a, to reach the right eye ER, while a light beam R2 directed toward the left eye EL is screened by the barrier 300b.

Consequently, only the light beams L1 from the left eye pixels L are incident on the left eye EL of the observer, while only the light beams R1 from the right eye pixels R are incident on the right eye ER. At this time, there is sufficient parallax information for a human being to perceive three-dimensional images by parallax between his or her eyes between the light beams L1 from the left eye pixels L and the light beams R1 from the right eye pixels R. Therefore, the observer can enjoy three-dimensional images.

In the 3-D display by a parallax barrier method, however, the light beams L2 and the light beams R2 from the pixels L and R are screened by the barriers 300b, whereby the amounts of light incident on the left and right eyes EL and ER of the observer are small, to darken the display screen 200.

Furthermore, if a general liquid crystal display (LCD) panel having a pixel pitch of approximately 0.1 mm is used for the display screen 200, the spacing between the slits 300a, that is, a barrier pitch in the parallax barrier plate 300 is approximately 0.2 mm in the conventional 3-D display by a parallax barrier method shown in FIG. 34.

On the other hand, there is a 3-D display capable of obtaining three-dimensional images in a wide range by constituting a display screen by a plurality of (more than two) columns of pixels, that is, a 3-D display of a multi-viewpoints type autostereoscopic. A barrier pitch in a case where the number of viewpoints is n in this multi-viewpoints type autostereoscopic 3-D display, that is, in the case of an n-viewpoints type autostereoscopic 3-D display is approximately (0.1×n) mm. In the conventional 3-D display by a parallax barrier method, the larger the value of n becomes, the more easily the barriers 300b in the parallax barrier plate 300 is recognized as vertical stripes.

Furthermore, a surface of the parallax barrier plate 300 on which the barriers 300b exist and the display screen 200 must be spaced apart from each other so as to view three-dimensional images. If the eyes of the observer are focused on the barriers 300b in the parallax barrier plate 300, therefore, it is impossible to satisfactorily view three-dimensional images.

Furthermore, as a method causing parallax to obtain three-dimensional images by the same function as that in the above described parallax barrier method, a method changing a light source into a slit light source is disclosed in U.S. Pat. No. 4, 717, 949, U.S. Pat. No. 4,829,365, U.S. Pat. No. 5,036,385, and U.S. Pat. No. 5,040,878. This method is a method of separating light beams incident on the left eye and the right eye of a observer by forming a light source in a stripe shape, in which three-dimensional images can be enjoyed without arranging anything in an image display portion on the side of the observer. The 3-D display disclosed in the above described patent uses as a light source "a flat screen in a plane shape having a plurality of limited light radiating portions separated from each other with regular spacing displayed along its surface and being dark between the radiating portions".

Examples of the above described light source include a light source of a spontaneous light type utilizing a fluorescent gas used for a fluorescent light tube packed in a thin groove of glass obtained by etching, a wire filament such as tungsten emitting light by thermal excitation when a current is caused to flow, for example, or an electron emitting material emitting light by excitation and non-excitation of electrons when an AC current is caused to flow and a light source of a projection type passing a laser beam through a diffraction grating and projecting an objective line on the reverse surface of a translucent sheet (a surface on the opposite side of a light valve).

In the above described 3-D display by a stripe light source method, however, it is impossible to bring a light emitting portion into close contact with the image display portion with respect to the light source of a spontaneous light type, whereby the viewing distance becomes very large. On the other hand, the 3-D display is not only increased in size but also complicated in construction with respect to the light source of a projection type.

Furthermore, in the 3-D display by a lenticular method, the wall thickness of a lenticular lens method is large. If a pixel pitch in a display screen is decreased, therefore, a proper viewing position where light beams from pixels are gathered on the left and right eyes of a observer is far from the display screen.

If the display screen is constituted by a display screen having black matrix portions, for example, an LCD panel, regions corresponding to the black matrix portions are also formed in the proper viewing position. Even if the observer slightly moves his or her head, therefore, the observer cannot view three-dimensional images because the eyes of the observer are positioned in the regions corresponding to the black matrix portions so that the display screen is darkened.

SUMMARY OF THE INVENTION

The present invention has been made in order to overcome the disadvantages of the above described prior art and has for its object to provide a 3-D display of simple construction and capable of displaying three-dimensional images by bringing light from a light source to a stripe shape.

Another object of the present invention is to provide a 3-D display capable of displaying three-dimensional images by bringing light from a light source to a stripe shape, which effectively utilizes the light from the light source and has a bright display screen.

Still another object of the present invention is to provide a 3-D display in which the range in which three-dimensional images can be viewed is made wider than that in a 3-D display by a lenticular method.

A further object of the present invention is to provide a 3-D display which makes it possible to view three-dimensional images even at a small pixel pitch, although it is manufactured using a conventional manufacturing apparatus.

A still further object of the present invention is to provide a 3-D display so adapted that the range in which three-dimensional images can be viewed at the maximum illuminance without increasing a crosstalk region can be enlarged.

A 3-D display according to the present invention comprises a flat light source, a vertical striped filter having slits transmitting light from the light source and barriers screening the light from the light source alternately formed horizontally therein for partially transmitting the light from the light source, and a display panel of a transmission type arranged on the light emission side of the vertical striped filter and having left eye pixels and right eye pixels alternately formed horizontally therein, light passing through the left eye pixels in the display panel and light passing through the right eye pixels being emitted toward a observer in a separated state.

According to the present invention, the light from the light source is changed into light in a stripe shape by the vertical striped filter, whereby the light passing through the left eye pixels in the display panel and the light passing through the right eye pixels are satisfactorily separated. If a right eye image and a left eye image in the three-dimensional images are respectively displayed on one column of pixels and the other column of pixels, therefore, the images are separated, whereby the observer perceives the three-dimensional images. Since a part of the light emitted from the light source is screened by the barriers in the vertical striped filter, the utilization factor of the light is decreased. If a surface, on the side of the light source, of the vertical striped filter is composed of a metal such as aluminum or a material having a high index of reflection such as white ink, however, the screened light can be directed toward the slits in the vertical striped filter while being repeatedly reflected toward the light source and reflected from a reflecting mirror provided in the light source, thereby to make it possible to increase the utilization factor of the light to increase the illuminance of the images. In the present invention, therefore, nothing is provided in the display panel on the side of the observer, thereby to make it possible to view more natural three-dimensional images, as compared with that in the conventional 3-D display by a parallax barrier method.

Furthermore, the 3-D display according to the present invention can be so constructed that the barriers in the vertical striped filter are constituted by a reflector for reflecting the light from the light source toward the light source, and reflecting means for reflecting the light reflected from the barriers toward the vertical striped filter is arranged on the opposite side of the vertical striped filter with respect to the light source.

In the above described construction, the light from the light source reflected from the barriers, which are constituted by the reflector, in the vertical striped filter is reflected from the reflecting means, finally to pass through the slits while being repeatedly reflected between the barriers and the reflecting means. Much of light from the light source finally passes through the slits in the vertical striped filter, to reach the display panel.

Furthermore, the reflector constituting the barriers and the reflecting means are composed of a material having a high index of reflection such as Al or Ag, whereby the light hardly decays while it is being repeatedly reflected as described above, and much of the light from the light source reaches the display panel.

Furthermore, the 3-D display according to the present invention can be so constructed that a diffusing panel for dispersing the light from the light source is arranged between the light source and the vertical striped filter.

In the above described construction, the light from the light source reaches the vertical striped filter in a state where it is dispersed by the diffusing panel, whereby the intensity of the light depending on the position of the light source is reduced. Consequently, the shadow of the light source is not cast on the display panel.

Furthermore, the 3-D display according to the present invention can be so constructed that anti-reflection coatings are formed on surfaces, on the light emission side, of the barriers in the vertical striped filter.

In the above described construction, external light incident on the display panel from the side of the observer is not reflected, not to adversely affect displayed images. In addition, an LCD panel is suitable for the display panel of a transmission type.

Furthermore, the whole of the vertical striped filter according to the present invention may be divided into a plurality of cycles in a vertical stripe shape, to form slits so that slit pitches in each of the cycles are non-uniform, and the average of the slit pitches in the cycle takes an ideal value operated from a distance between observer's eyes and a pixel pitch.

If the above described vertical striped filter is used, the light passing through the slits from the pixels in the display panel almost converges on two convergent points with approximately the same spacing as the ideal distance between observer's eyes, as in the case of the ideal barrier pitch, whereby the variation in the barrier pitches in each of the cycles is ignored in the case of view with the naked eye, thereby to perceive the same three-dimensional effect as that in a case where a vertical striped filter having an ideal barrier pitch is used.

In the above described vertical striped filter, the spacing between the slits, that is, the barrier pitches in each of the cycles may be non-uniform, whereby barrier pitches which can be formed by the conventional manufacturing apparatus can be mixed.

Since the barrier pitches in each of the cycles may be non-uniform, the number of types of barrier pitches may be a plural. That is, not less than three types of barrier pitches may be mixed in the cycle. In order to simplify the control of the manufacturing apparatus, it is preferable that two types of barrier pitches, for example, a barrier pitch larger than an ideal value and closest to the ideal value which can be formed and a barrier pitch smaller than the ideal value and closest to the ideal value which can be formed are combined with each other.

If two types of barrier pitches are thus mixed in each of the cycles, it is possible to simply operate the mixture ratio by a method of calculating the values of two unknown quantities from their unit total and the total of one of their attributes. For example, in a manufacturing method utilizing a laser for controlling the position for irradiation in units of 1 μm, it is possible to manufacture a vertical striped filter having an average barrier pitch of 0.22037 mm if a barrier pitch of 0.221 mm larger than the ideal value 0.22037 mm and a barrier pitch of 0.220 mm smaller than the ideal value are mixed at random at a ratio of 10:17.

Specifically, a vertical striped filter having the average barrier pitch equal to the ideal value can be manufactured by directly utilizing the manufacturing apparatus currently employed, thereby to make it possible to obtain a 3-D display using a slit light source method.

The present invention provides a 3-D display so adapted that a vertical striped filter having a plurality of column-shaped slits each having a very small width parallel to columns of pixels in a display panel of a transmission type having a pixel shape having at least black portions in a vertical stripe shape is arranged on the side of a light source with respect to the display panel so that three-dimensional images can be viewed, which is characterized in that the transverse aperture width of a pixel M in the display panel is not less than one-half and less than two-thirds a pixel pitch L, and the aperture ratio of the slits in the vertical striped filter is approximately not less than $(L-M)/nL$ nor more than $M/nL$.

Furthermore, the present invention provides a 3-D display so adapted that a vertical striped filter having a plurality of column-shaped slits each having a very small width parallel to columns of pixels in a display panel of a transmission type having a pixel shape having at least black portions in a vertical stripe shape is arranged on the side of a light source with respect to the display panel so that three-dimensional images can be viewed, which is characterized in that the transverse aperture width of a pixel M in the display panel is less than one-half a pixel pitch L, and the aperture ratio of the slits in the vertical striped filter is approximately not more than $(L-M)/nL$.

Additionally, the present invention provides a 3-D display so adapted that a vertical striped filter having a plurality of column-shaped slits each having a very small width parallel to columns of pixels in a display panel of a transmission type having a pixel shape having at least black portions in a vertical stripe shape is arranged on the side of a light source with respect to the display panel so that three-dimensional images can be viewed, which is characterized in that the transverse aperture width of a pixel M in the display panel is not less than two-thirds a pixel pitch L, and the aperture ratio of the slits in the vertical striped filter is approximately more than $(L-M)/nL$ and not more than $2(L-M)/nL$.

According to the present invention, the aperture ratio of the slits in the vertical striped filter is set as described above on the basis of the transverse aperture width of a pixel and the pixel pitch in the display panel of a transmission type having a pixel shape having at least black portions in a vertical stripe shape, thereby to obtain a 3-D display having a wider region where three-dimensional images can be viewed than that in a lenticular lens method.

In the present invention, the 3-D display is characterized by comprising a light source, a display panel, and a vertical striped filter located on the side of a observer with respect to the display panel, a grid-shaped vertical striped filter on the side of the light source having a lot of slits arranged therein being located between the display panel and the light source on the premise that the 3-D display separates images on the display panel by the vertical striped filter.

In the present invention, the relationship among the center of the pupil of the observer, the center of each of the pixels in the display panel, the center of the slit in the vertical striped filter on the side of the observer which corresponds to the pixel, and the center of the slit in the vertical striped filter on the side of the light source which corresponds to the pixel is not particularly limited. In order to reduce the loss of light, however, it is preferable that the vertical striped filter on the side of the observer, the display panel and the vertical striped filter on the side of the light source are so located that all the centers are arranged on one straight line.

In this case, it is preferable that the aperture ratio of the slits in the vertical striped filter on the side of the observer and the aperture ratio of the slits in the vertical striped filter on the side of the light source are substantially the same. It is not preferable that the aperture ratio of the slits in the vertical striped filter on the side of the observer is increased because a crosstalk region is increased. In addition, it is not preferable that the aperture ratio of the slits in the vertical striped filter on the side of the light source is decreased because the utilization factor of the light is decreased.

In the present invention, letting L be a pixel pitch in the display panel and l be an aperture width of a pixel, it is preferable that both the aperture ratio of the slits in the vertical striped filter on the side of the observer and the aperture ratio of the slits in the vertical striped filter on the side of the light source are not more than approximately $\{(2L+l)/4L\} \times 100\%$.

It is not preferable that one or both of the aperture ratio of the slits in the vertical striped filter on the side of the observer and the aperture ratio of the slits in the vertical striped filter on the side of the light source are more than approximately $\{(2L+l)/4L\} \times 100\%$ because a region where a left eye image and a right eye image are overlapped with each other at the maximum illuminance occurs in a crosstalk region.

If both the aperture ratio of the slits in the vertical striped filter on the side of the observer and the aperture ratio of the slits in the vertical striped filter on the side of the light source are in the neighborhood of $\{(2L+1)/4L\} \times 100\%$, a region where three-dimensional images can be viewed at the maximum illuminance is sufficiently wide, and the crosstalk region is not overlapped with a region where the maximum illuminance is obtained. Moreover, in a region where illuminance is decreased from the maximum illuminance of one of the left eye image and the right eye image, the other illuminance is increased. If the observer is moved rightward or leftward from an optimum viewing position, therefore, the whole illuminance becomes constant, that is, maximum.

If both the aperture ratio of the slits in the vertical striped filter on the side of the observer and the aperture ratio of the slits in the vertical striped filter on the side of the light source are not more than approximately $\{(2L+1)/4L\} \times 100\%$, the aperture ratio of the pixels may be less than 50%. However, it is preferable that the aperture ratio of the pixels is not less than 50% because a region where three-dimensional images can be viewed at the maximum illuminance is enlarged without increasing the crosstalk region.

In the present invention, it is preferable that both the aperture ratio of the slits in the vertical striped filter on the side of the observer and the aperture ratio of the slits in the vertical striped filter on the side of the light source are not more than $(1/L) \times 100\%$ nor less than 50%.

It is not preferable that either one or both of the aperture ratio of the slits in the vertical striped filter on the side of the observer and the aperture ratio of the slits in the vertical striped filter on the side of the light source are less than 50% because a region where the maximum illuminance is obtained is decreased. In addition, it is not preferable that either one or both of the aperture ratio of the slits in the vertical striped filter on the side of the observer and the aperture ratio of the slits in the vertical striped filter on the side of the light source are more than (1/L)×100% because the crosstalk region is increased.

In the present invention, the light reflected from the rear surface of the display panel or black portions between the pixels is reflected again from the vertical striped filter on the side of the light source, and is incident on the pixels in the display panel, to decrease the contrast of images. If a surface, on the side of the display panel, of the vertical striped filter on the side of the light source is composed of a material having a low index of reflection, however, the light directed toward the vertical striped filter on the side of the light source from the display panel is absorbed by the surface, on the side of the display panel, of the vertical striped filter on the side of the light source to prevent the light from being irregularly incident on the pixels in the display panel, thereby to make it possible to prevent the muddiness of color and the decrease in contrast.

According to the above described invention, a grid-shaped vertical striped filter having a lot of slits arranged therein is located between the display panel and the light source, and the aperture ratio of the slits in the vertical striped filter on the side of the observer ahead of the display panel and the aperture ratio of the slits in the vertical striped filter on the side of the light source are suitably designed, thereby to make it possible to simultaneously satisfy the conditions under which the maximum illuminance is obtained and the conditions under which there is no crosstalk region even if an LCD display panel having a transverse aperture ratio of pixels of 50% is used.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description is now made of a first embodiment of the present invention.

Figure 1:
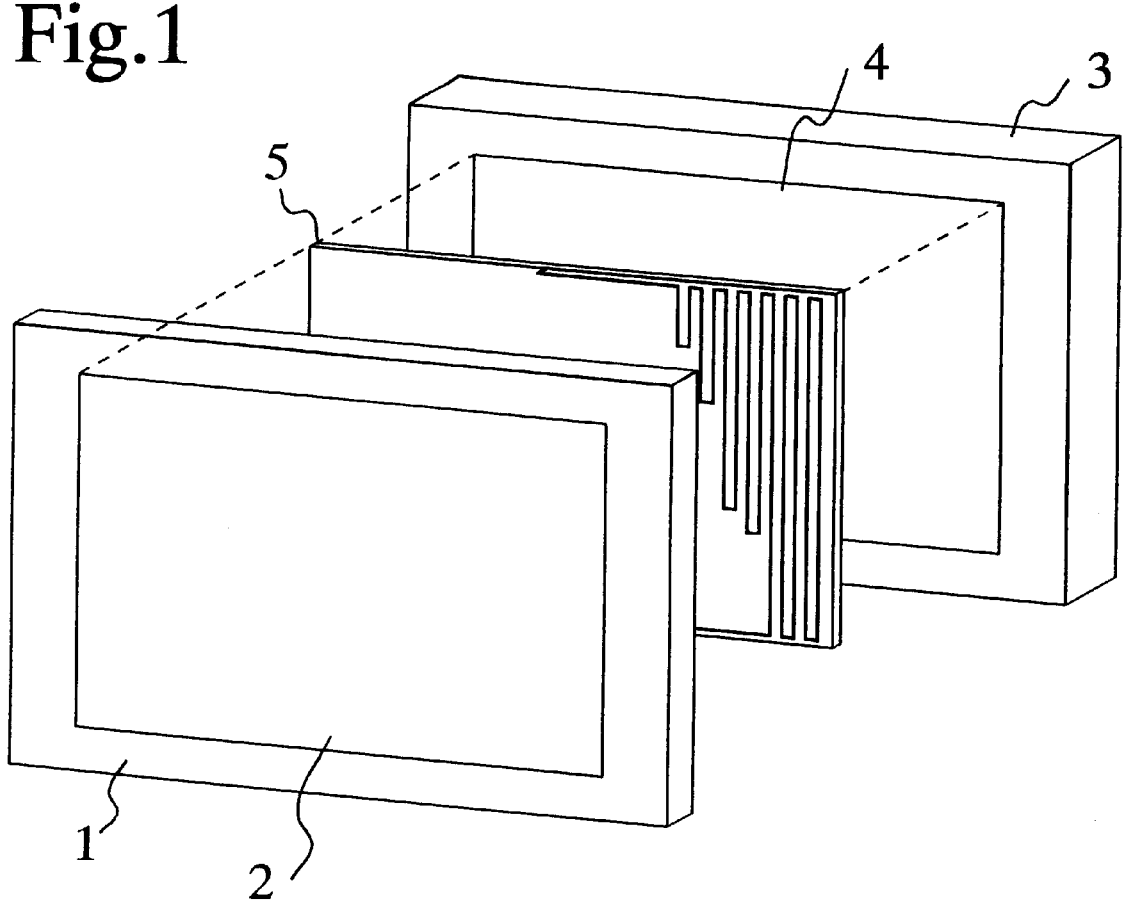
FIG. 1 is an exploded perspective view showing the construction of a 3-D display according to a first embodiment of the present invention.

FIG. 1 is an exploded perspective view showing a 3-D display according to a first embodiment of the present invention. The 3-D display according to the present. embodiment comprises an LCD panel 1, and light from a light emitting portion 4 of a flat light source 3 which is composed of a cold cathode type flat fluorescent lamp, for example, is applied to a display portion 2 of the LCD panel 1. A vertical striped filter 5 serving as an optical filter for bringing the light from the flat light source 3 to a strip shape is arranged between the LCD panel 1 and the flat light source 3.

The vertical striped filter 5 has slits 5c transmitting the light from the flat light source 3 and barriers 5b screening the light from the flat light source 3 alternately formed horizontally therein for partially transmitting the light from the flat light source 3 to bring the light from the flat light source 3 to a stripe shape. In this vertical striped filter 5, a transparent glass substrate 5a is coated with a sensitizing agent and is irradiated in a stripe shape by light to blacken the sensitizing agent, whereby the barriers 5b serving as light screening portions are formed, and the slits 5c are formed by removing an excess sensitizing agent. Further, the vertical striped filter 5 can be also produced by a printing technique such as screen printing.

Furthermore, a series of images picked up in two directions or in many directions are displayed as vertical slit images on the display portion 2 of the LCD panel 1.

Figure 3:
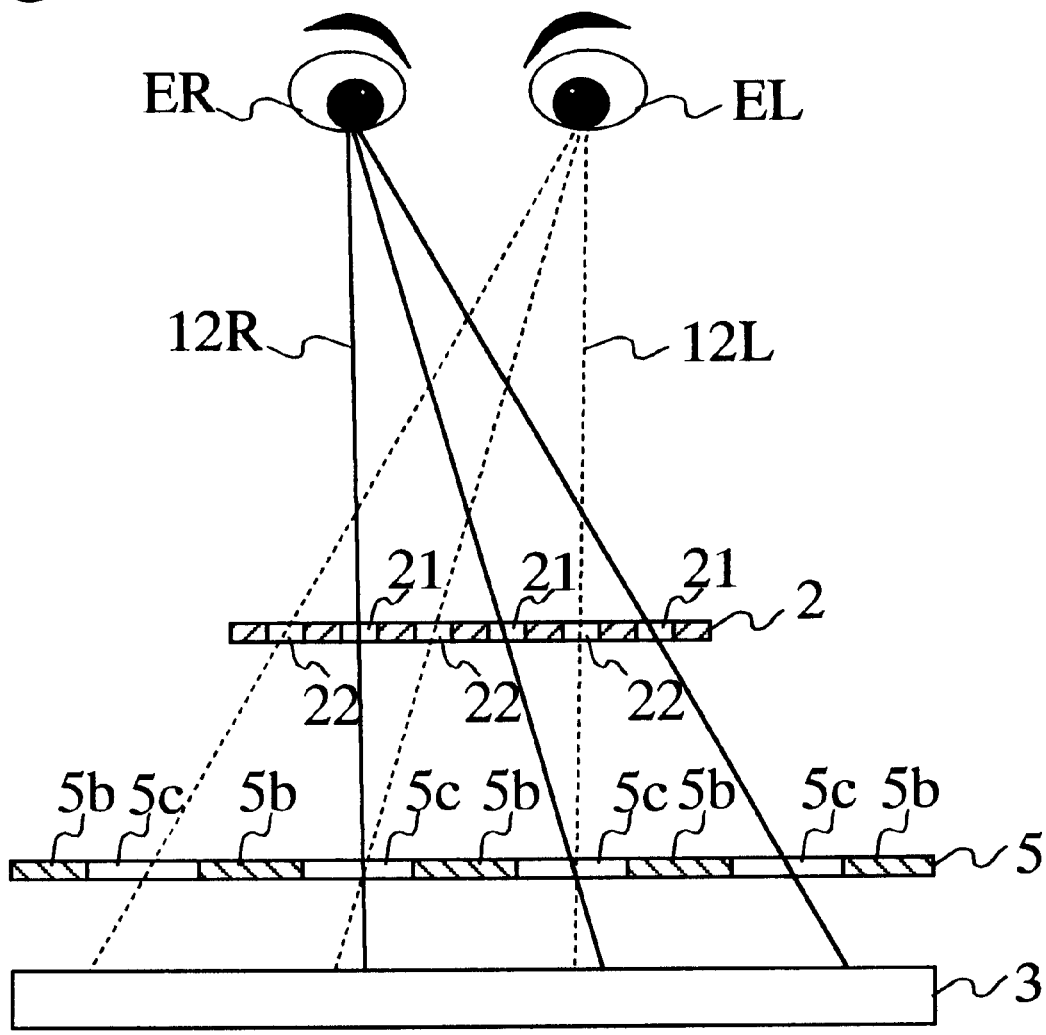
FIG. 3 is a schematic view showing the construction of the 3-D display according to the first embodiment of the present invention.

In the present embodiment, each of the slits 5c in the vertical striped filter 5 is so arranged as to correspond to a pair of columns of pixels 21 and 22 in the image display portion 2, as shown in FIG. 3. The width of the slit 5c and a pitch between the slits 5c are set to suitable values, and only an image displayed on the column of pixels 21 (the column of pixels 22) is viewed from the right eye (the left eye) of a observer so that an image displayed on the column of pixels 21 (the column of pixels 22) cannot be seen.

Light emitted from the flat light source 3 passes through each of the slits 5c in the vertical striped filter 5, to reach the image display portion 2 in the LCD panel 1, and passes through the image display portion 2, to reach the left eye or the right eye.

Specifically, in the present invention, the light emitted from the flat light source 3 passes through each of the slits 5c in the vertical striped filter 5 arranged between the flat light source 3 and the image display portion 2 and then, passes through each of pixels in the image display portion 2. Only the image displayed on the column of pixels 21 (the column of pixels 22) is viewed from the right eye ER (the left eye EL) of the observer so that the image displayed on the column of pixels 22 (the column of pixels 21) cannot been seen.

The pixels in the LCD panel 1 comprises left eye pixels L and right eye pixels R alternately formed horizontally, and a right eye image and a left eye image are respectively displayed on the column of pixels 21 and the column of pixels 22, as shown in FIG. 3. A light beam 12L passing through the left eye pixel 22 is incident on the left eye EL of the observer and a light beam 12R passing through the right eye pixel 21 is incident on the right eye ER of the observer out of light beams passing through the slits 5c from the flat light source 3 and emitted in a stripe shape.

There is sufficient parallax information for a human being to perceive three-dimensional images between the left eye pixels 22 and the right eye pixels 21. The observer can perceive three-dimensional images by parallax between both his or her eyes.

Figure 4:
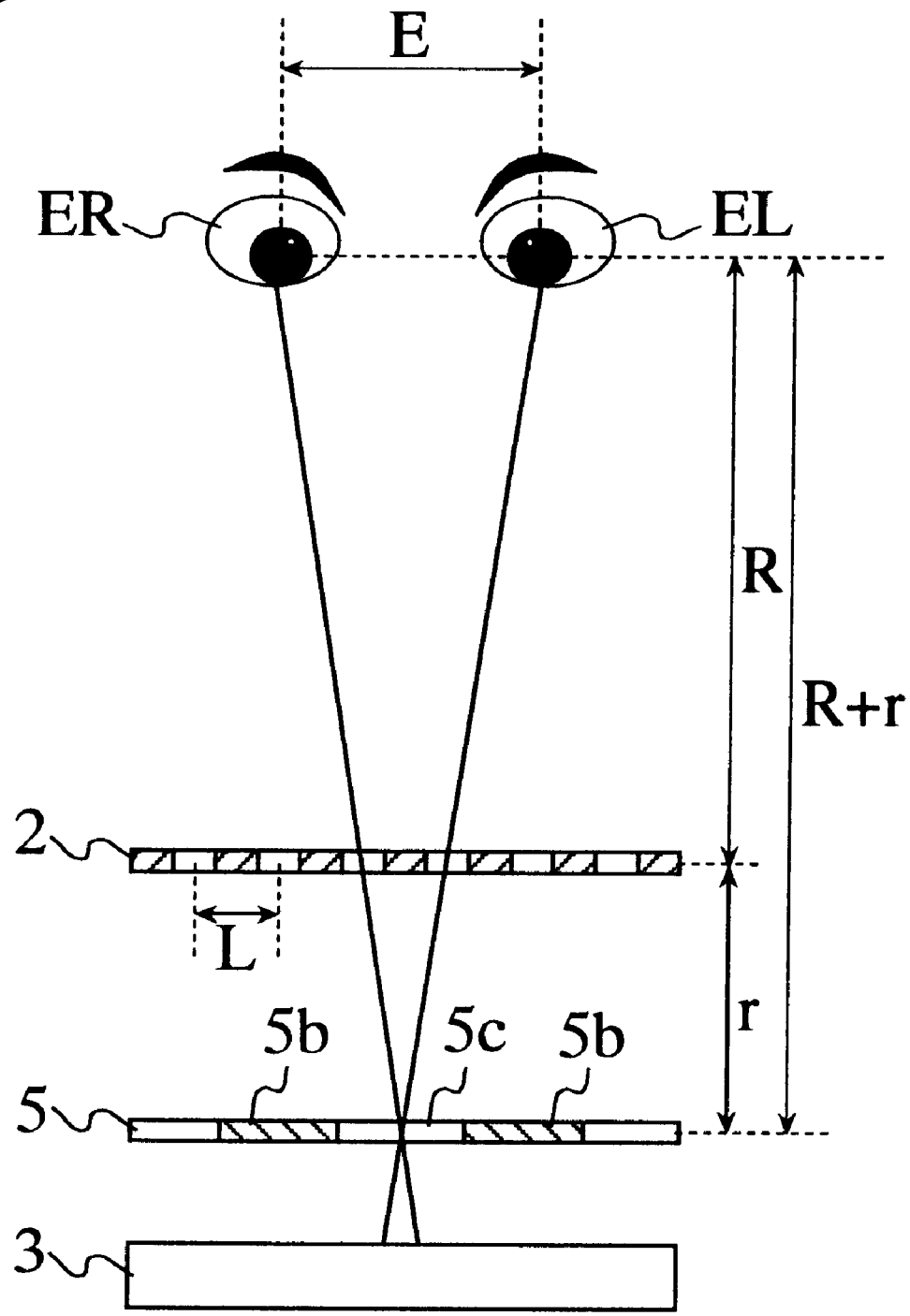
FIG. 4 is a schematic view showing the construction of the 3-D display according to the first embodiment of the present invention.

In the present invention, letting L be a pixel pitch in the image display portion 2, E be a distance between the pupils of the observer, r be a reduced value in the air of the spacing between a surface of the vertical striped filter 5 on which the barriers 5b exist and the image display portion 2, and R be the spacing between the image display portion 2 and the observer (the viewing distance), the relationship shown in FIG. 4 holds, to obtain the following relational expressions:

$$L:r=E:(R+r) \qquad (1)$$

$$R=(E-L)r/L \qquad (2)$$

In the present embodiment, the LCD panel 1 is an LCD panel having a pixel pitch L of 0.11 mm. In addition, the LCD panel 1 has a structure in which a liquid crystal is interposed in a glass plate having a thickness of 1.1 mm (the index of refraction is 1.53), and a polarizing film having a thickness of 0.2 mm (the index of refraction is 1.49) is affixed to the outside of the glass plate.

The values of the pixel pitch, the thickness of the glass plate and the thickness of the polarizing film in the present embodiment are close to values in an LCD panel commonly used.

A reduced value in the air r of the total of the thickness of the glass plate and the thickness of the polarizing film becomes 0.85 mm, which can be said to be the minimum value of r. In addition, the distance between the pupils E is approximately 65 mm in the average human being.

In the present embodiment, the barriers 5b in the vertical striped filter 5 are directed toward the LCD panel 1, whereby r takes the minimum value 0.85 mm, and the viewing distance R also takes the minimum value 501 mm. If the LCD panel 1 is a commonly used LCD panel which is not more than approximately 10 inches in diagonal, it is considered that this viewing distance is most suitable.

If the vertical striped filter 5 is arranged between the glass plate and the polarizing film, the value of the viewing distance R is further decreased.

Furthermore, if the barriers 5b in the vertical striped filter 5 are formed on the glass plate in the LCD panel 1, the thickness of the 3-D display can be made very small.

Additionally, the vertical striped filter 5 has the slits (light transmitting portions) 5c parallel to the columns of pixels in the LCD panel 1. If three-dimensional images are viewed at two viewpoints, for example, the slits 5c are so formed that one of the slits 5c corresponds to two columns of pixels which are adjacent to each other in the LCD panel 1.

Figure 5:
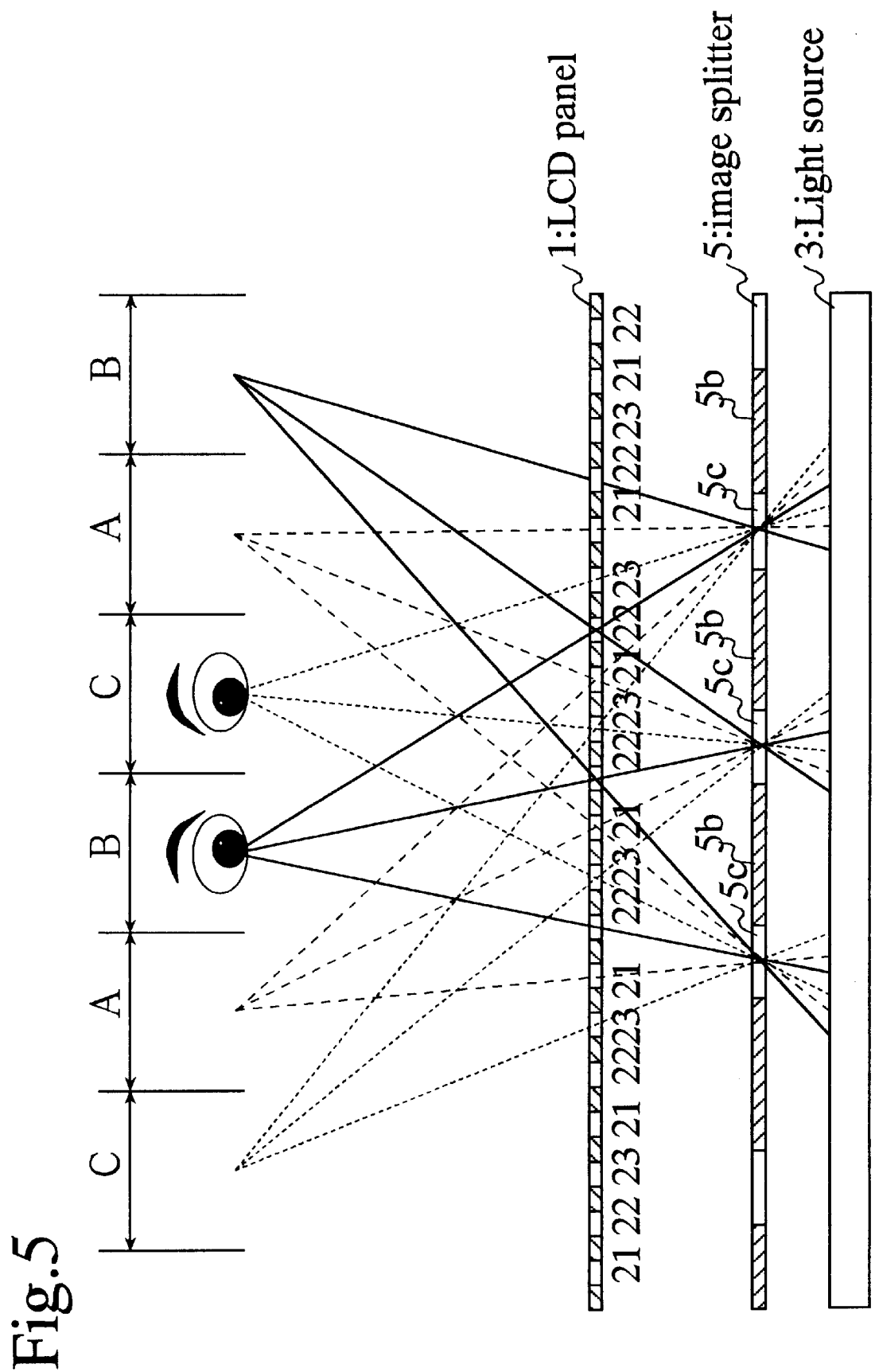
FIG. 5 is a schematic view for explaining the relationship in a case where the 3-D display according to the present invention is applied to a three-viewpoints type autostereoscopic 3-D display.
Figure 6:
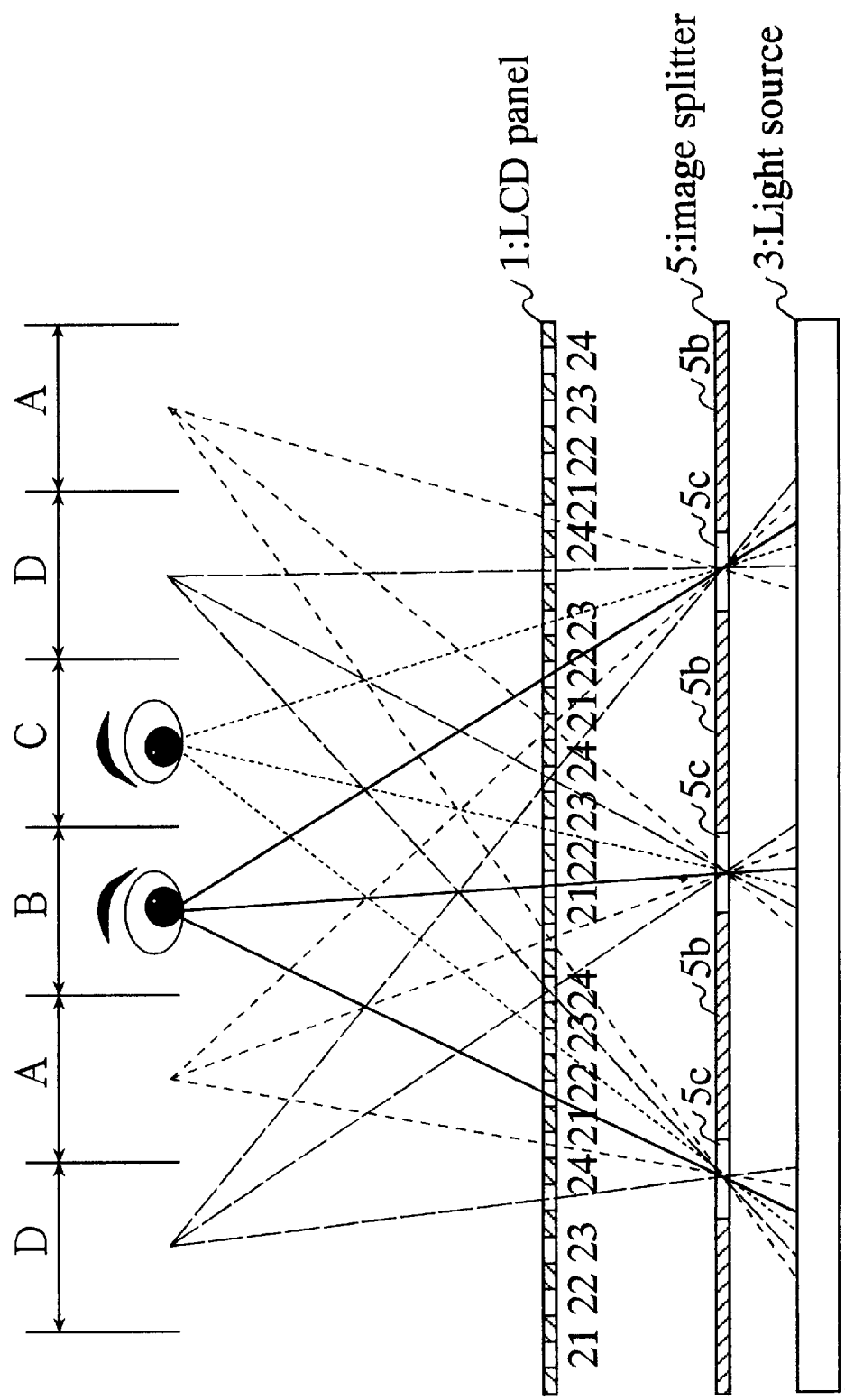
FIG. 6 is a schematic view for explaining the relationship in a case where the 3-D display according to the present invention is applied to a four-viewpoints type autostereoscopic 3-D display.

As shown in FIGS. 5 and 6, if an image display portion is constituted by a plurality of (more than two) columns of pixels, an image displayed on the column of pixels 21 can be almost viewed only in a range A, and images displayed on the columns of pixels 22 to 24 can be similarly viewed only in ranges B to D. Even if a observer moves his or her head, therefore, three-dimensional images are obtained in the ranges A to D. At this time, slightly different images are displayed in the columns of pixels 21 to 24 so that three-dimensional images are obtained. This is a method corresponding to a multi-viewpoints type autostereoscopic 3-D display. FIG. 5 shows a three-viewpoints type autostereoscopic 3-D display, and FIG. 6 shows a four-viewpoints type autostereoscopic 3-D display.

Figure 2:
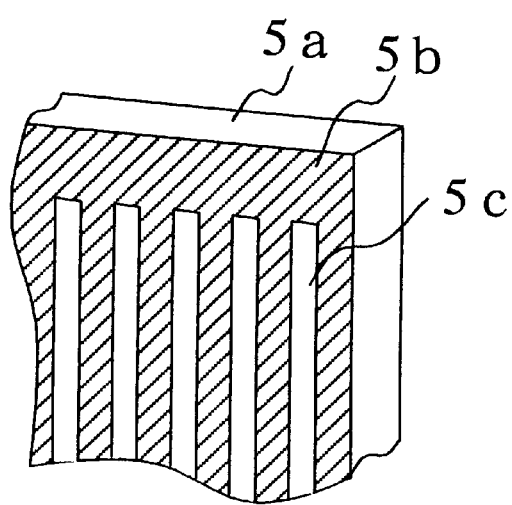
FIG. 2 is a perspective view showing the construction of a vertical striped filter in the 3-D display according to the first embodiment of the present invention.

Another example of the vertical striped filter 5 will be described. The vertical striped filter 5 according to the present embodiment is constructed by forming barriers 5b constituted by a stripe-shaped light reflector composed of a material having a high index of reflection such as aluminum (Al) on a transparent glass substrate 5a by a thin film forming process such as sputtering, evaporation or ion plating, as shown in FIG. 2. The vertical striped filter 5 have slits (light transmitting portions) 5c parallel to the columns of pixels in the LCD panel 1, as described above. If three-dimensional images are viewed at two viewpoints, for example, however, the slits 5c are so formed that one of the slits 5c corresponds to two columns of pixels which are adjacent to each other in the LCD panel 1. The above described barriers 5b can be also formed by printing a white or sliver coating or the like.

Figure 7:
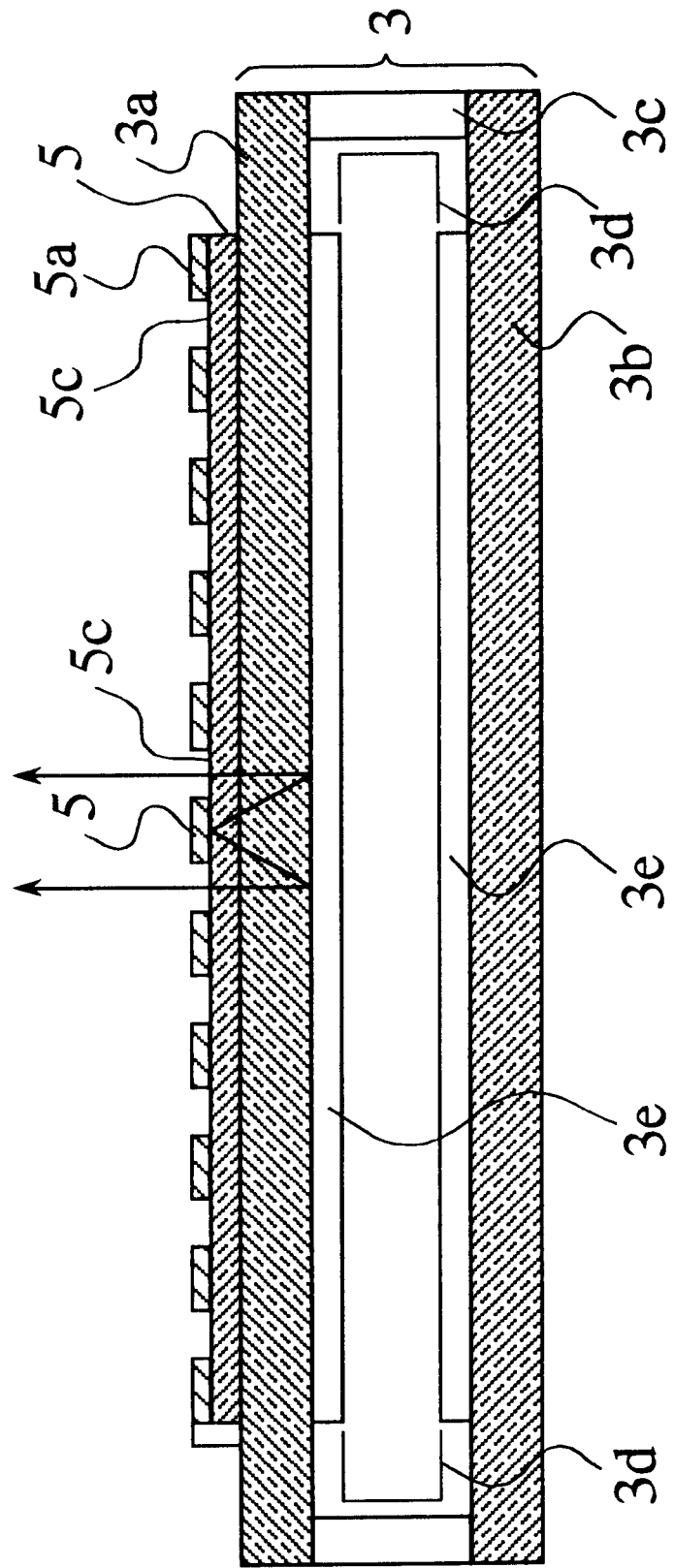
FIG. 7 is a schematic view showing the construction of a light source in the 3-D display according to the first embodiment of the present invention.

The vertical striped filter 5 is mounted by adhesion on the flat light source 3 constituted by a cold cathode type flat fluorescent lamp on the side of the light emitting portion 4, as shown in FIG. 7.

The flat light source 3 is constructed by arranging a pair of hollow cathodes 3e on the right and left positions in a closed glass box constituted by a front panel 3a, a rear panel 3b and frame glass 3c, applying fluophor 3d to the inner surfaces of the front panel 3a and the rear panel 3b, and further filling the closed glass box with a mercury vapor and an argon gas. Discharges are induced between the hollow cathodes 3e, whereby the mercury vapor in the closed glass box is excited to emit ultraviolet rays, and fluorescent bodies 3d are excited by the ultraviolet rays. Consequently, the flat light source 3 emits light.

The light emitted from the flat light source 3 passes through the slits 5c in the vertical striped filter 5, to reach the display portion 2 of the LCD panel 1, and passes through the display portion 2, to reach the left eye or the right eye.

The barriers 5b in a stripe shape are composed of a material having a high index of reflection such as Al, and light beams striking the barriers 5b out of light beams emitted from the flat light source 3 are repeatedly reflected without being absorbed by the barriers 5b, to finally pass through the slits 5c. Specifically, almost all of the light beams emitted from the flat light source 3 are emitted outward through the slits 5c, to reach the LCD panel 1. Consequently, the brightness of the display portion 2 of the LCD panel 1 is increased.

Furthermore, if a layer having a low index of reflection is formed on the upper surface of an aluminum sheet forming the barriers 5b, the light from the light source 3 is reflected from the barriers 5b to increase the brightness of the display portion 2, while external light is absorbed by the layer having a low index of reflection to prevent reflection of the external light.

Although in the above described embodiment, the flat light source 3 is constituted by a cold cathode type flat fluorescent lamp, the present invention is not limited to the same. For example, a reflection type illumination optical system constituted by a light emitting lamp, a reflector and a diffusing panel, a light guider type illumination optical system utilizing multiple reflection of light on the inner surface and the surface of a light guider such as acrylic resin, a cathode-luminescence high-intensity flat light source or the like may be used.

In the above described 3-D display according to the first embodiment, the light beams striking the barriers 5b out of the light beams emitted from the flat light source 3 pass through the slits 5c after being repeatedly reflected between the barriers 5b and the fluophor 3d, to reach the LCD panel 1. Consequently, the 3-D display is superior because the brightness of the display portion 2 is higher, as compared with that in the conventional 3-D display by a parallax barrier method.

Figure 8:
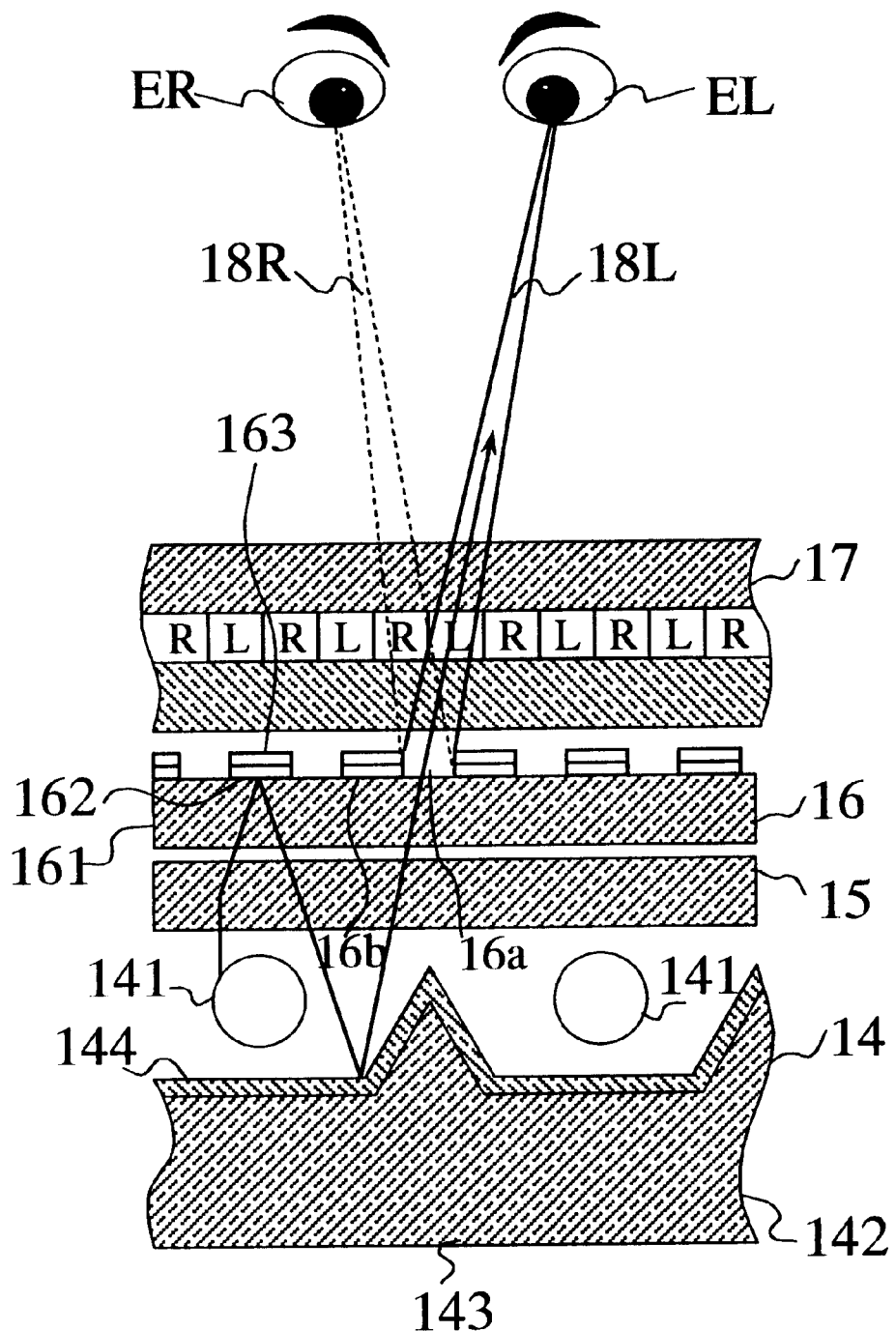
FIG. 8 is a cross sectional view showing the construction of a 3-D display according to a second embodiment of the present invention.

In the 3-D display of the construction shown in FIG. 7, the fluophor 3d have a low index of reflection, and absorb much of light. Accordingly, much of the light which is repeatedly reflected many times is absorbed by the fluophor 3d. Consequently, the light emitted from the flat light source 3 is not utilized sufficiently efficiently. Therefore, a second embodiment of the present invention utilizing light efficiently is illustrated in FIG. 8.

A 3-D display according to the second embodiment is constituted by a light equipment 14, a diffusing panel 15, a vertical striped filter 16, and an LCD panel 1. The above described light equipment 14 is constituted by a light source 141 composed of a fluorescent lamp and a reflector 142 arranged on the opposite side of a observer with respect to the light source 141. The reflector 142 has a reflecting film 144 composed of Ag or Al formed on a surface of the substrate 143 composed of white resin on the side of the light source 141 by evaporation or the like. The index of reflection of Ag is 0.95, and the index of reflection of Al is 0.92, which are higher than the index of reflection of white resin (the index of reflection is 0.8) comprising the substrate 143.

The diffusing panel 15 is arranged on the side of the observer with respect to the light equipment 14. The diffusing panel 15 disperses light from the light source 141, and is constituted by a prism sheet, ground glass or the like absorbing little light, whereby the shadow of the light source 141 is not cast on the side of the observer.

The above described vertical striped filter 16 is arranged on the side of the observer with respect to the diffusing panel 15. Reflecting films 162 composed of Al, Ag or the like are formed in a stripe shape on a part of a surface, on the side of the observer, of a transparent glass plate 161, and anti-reflection coatings 163 composed of Cr or the like are respectively formed on the reflecting films 162. Consequently, portions of only the glass plate 161 where the reflecting films 162 are not formed become slits 16a transmitting light, and portions of the glass plate 161 where the reflecting films 162 are formed become barriers 16b screening light.

The above described LCD panel 1 is arranged on the side of the observer with respect to the vertical striped filter 16, and has left eye pixels L and right eye pixels R alternately formed horizontally therein.

The positional relationship between the slits 16a and the left and right pixels L and R is such a relationship that one of the slits 16a exists with respect to one set of left and right pixels L and R. In the 3-D display according to the present embodiment, light beams directed toward the observer out of light beams emitted from the light source 141 are dispersed by the diffusing panel 15, and are directed toward the vertical striped filter 16. The light beams directed toward the slits 16a pass through the slits 16a, to directly reach the LCD panel 17. On the other hand, the light beams directed toward the barriers 16b are reflected toward the light equipment 14 by the reflecting films 162. The light beams are reflected from the reflecting film 144 in the light equipment 14, and are directed toward the vertical striped filter 16 again. Thereafter, the light beams directed toward the slits 16a pass through the slits 16a, to reach the LCD panel 17. The light beams directed toward the barriers 16b are repeatedly reflected many times between the reflecting films 162 and the reflecting film 144 until they pass through slits 16a.

Furthermore, light beams directed toward the reflector 142 out of the light beams emitted from the light source 141 are reflected from the reflecting film 144, and are directed toward the vertical striped filter 16. The light beams are repeatedly reflected many times between the reflecting films 162 and the reflecting film 144, similarly to the light beams directed toward the observer out of the light beams emitted from the light source 141.

Specifically, the light beams emitted from the light source 141 are repeatedly reflected many times between the reflecting films 162 and the reflecting film 144 until they pass through the slits 16a. Since the reflecting films 162 and 144 are composed of a film having a high index of reflection such as Al or Ag, the light beams from the light source 141 are hardly absorbed when they are reflected from the reflecting films 162 and 144. Therefore, the light beams emitted from the light source 141 directly pass through the slits 16a, or are repeatedly reflected between the reflecting films 162 and 144 and then, pass through the slits 16a, to reach the LCD panel 1. Consequently, most of the light beams emitted from the light source 141 efficiently reach the LCD panel 1.

A light beam 18L passing through the left eye pixel L in the LCD panel 1 out of the strip-shaped light beams passing through the slit 16a is incident on the left eye EL of the observer in a proper viewing position and is not incident on the right eye ER of the observer. On the other hand, a light beam 18R passing through the right eye pixel R in the LCD panel 1 out of the strip-shaped light beams passing through the slit 16a is incident on the right eye ER of the observer in the proper viewing position and is not incident on the left eye EL.

Consequently, the observer in the proper viewing position views only the left eye pixels L with the left eye EL, while viewing only the right eye pixels R with the right eye RL, to recognize three-dimensional images by parallax between both the eyes.

As described in the foregoing, in the 3-D display according to the present embodiment, the light beams screened by the barriers 16b out of the light beams emitted from the light source 141 are also repeatedly reflected between the reflecting films 162 on the side of the barriers and the reflecting film 144 on the side of the light source without being absorbed, finally to pass through the slits 16a and reach the LCD panel 1. Specifically, most of the light beams emitted from the light source 141 reach the LCD panel 1, which are utilized as light for displaying three-dimensional images, whereby the brightness of the three-dimensional images is significantly increased.

Furthermore, the diffusing panel 15 is arranged on the side of the observer with respect to the light source 141, and the light beams from the light source 141 pass through the slits 16a in the vertical striped filter 16 in a dispersed state, to reach the LCD panel 1. Consequently, the shadow of the light source 141 is not cast on a display screen of the LCD panel 1, thereby not to degrade the quality of the three-dimensional images.

Since the anti-reflection coatings 163 are formed on surfaces, on the side of the observer, of the reflecting films 162 constituting the barriers 16b in the vertical striped filter 16, external light incident on the LCD panel 1 from the side of the observer is prevented from being reflected toward the observer again, to also prevent the three-dimensional images from being adversely affected.

According to the second embodiment, the light from the light source can be effectively utilized, thereby to make it possible to provide a 3-D display having a bright display screen.

Furthermore, according to the present embodiment, there can be provided a 3-D display capable of displaying good three-dimensional images without casting the shadow of a light source on a display screen.

Additionally, according to the present embodiment, there can be provided a 3-D display which prevents the adverse effects of external light incident on a display panel from the side of a observer.

Description is now made of a third embodiment in which in the above described 3-D display according to the present invention, the range in which three-dimensional images can be viewed is made wider than that in the 3-D display by a lenticular method.

Figure 9:
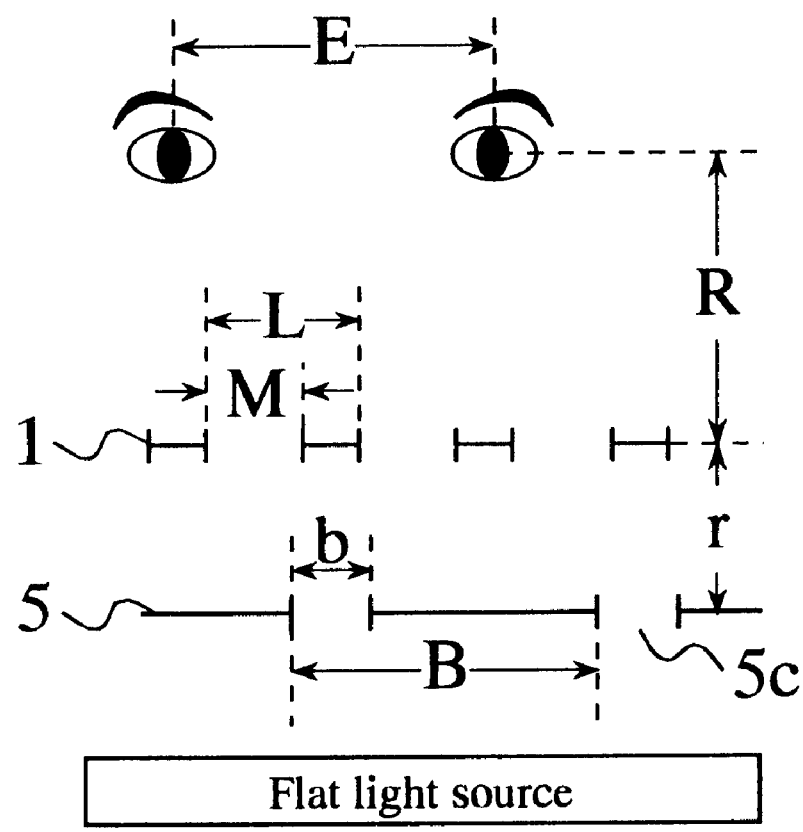
FIG. 9 is a structural drawing for explaining parameters in a third embodiment of the present invention.

Characters representing parameters used in the design of a 3-D display according to the third embodiment will be described with reference to FIG. 9.

Figure 10:
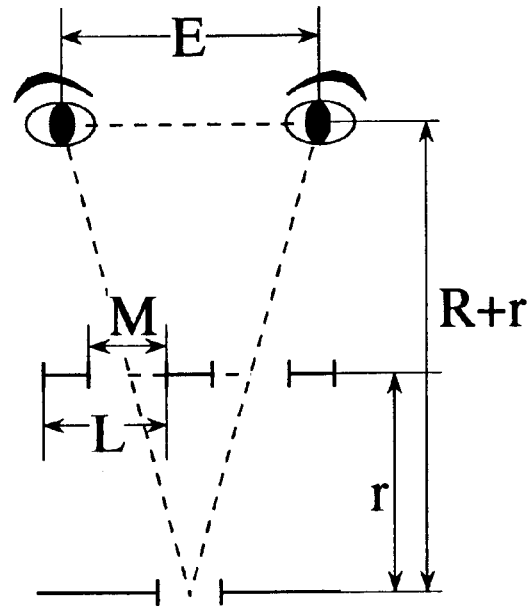
FIG. 10 is a structural drawing showing the relationship among the parameters used for explaining the principle of the third embodiment of the present invention.

Examples of the parameters used for this design include a transverse pitch B between slits 5c in a vertical striped filter 5, a transverse width b of a slit 5c in the vertical striped filter 5, a pixel pitch L in an LCD panel 1, a transverse aperture width of a pixel M in the LCD panel 1, a distance between observer's eyes E (=65 mm), a distance r between the LCD panel 1 and the vertical striped filter 5 (a reduced value in the air), and a distance R between the vertical striped filter 5 and the observer's eyes (a proper viewing distance). The following equations (3) and (4) hold among the parameters, as shown in FIG. 10:

$$L:r=E:(R+r) \tag{3}$$

$$\therefore L(R+r)=rE \tag{4}$$

Figure 11:
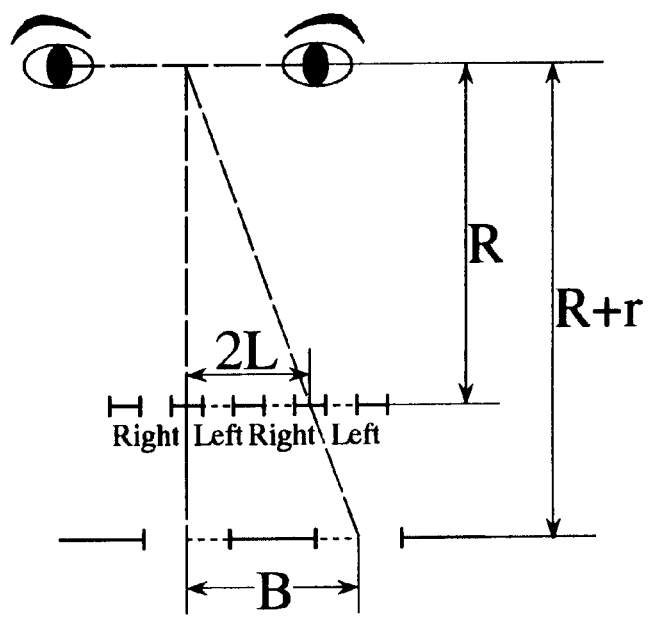
FIG. 11 is a structural drawing showing the relationship among the parameters used for explaining the principle of the third embodiment of the present invention.

Furthermore, the following equations (5) and (6) hold, as shown in FIG. 11:

$$2L:R=B:(R+r) \tag{5}$$

$$\therefore BR=2L(R+r) \tag{6}$$

Figure 12:
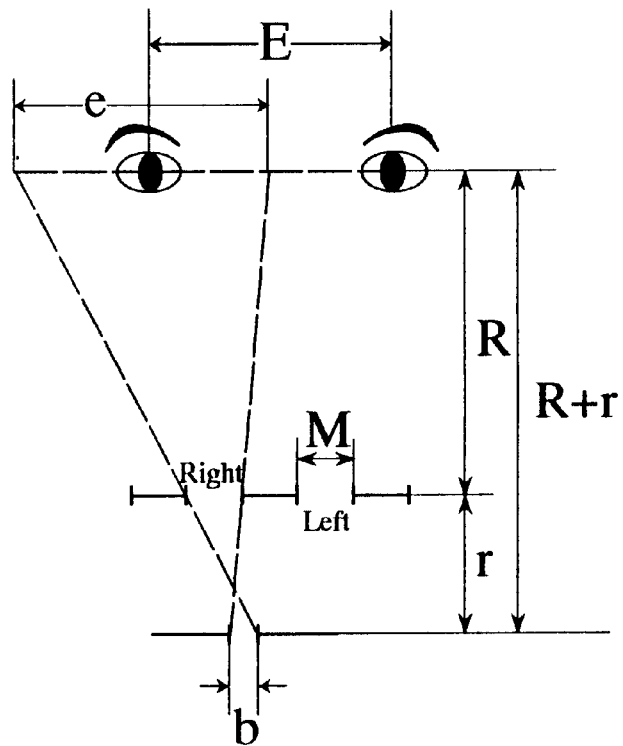
FIG. 12 is a structural drawing showing the relationship among the parameters used for explaining the principle of the third embodiment of the present invention.

An image formed on the LCD panel is as shown in FIG. 12. Light emitted from a pixel on which "left", for example, is written in the LCD panel travels in the range interposed between two dotted lines shown in FIG. 12. In a position spaced apart from the vertical striped filter 5 by the proper viewing distance R, it is possible to see the pixel if the lateral motion of the eye is within a range e.

The proper viewing position is the middle point of e, and the transverse range in which three-dimensional images can be viewed is considered, depending on which of the distance between observer's eyes E and the range e is larger.

Figure 13:
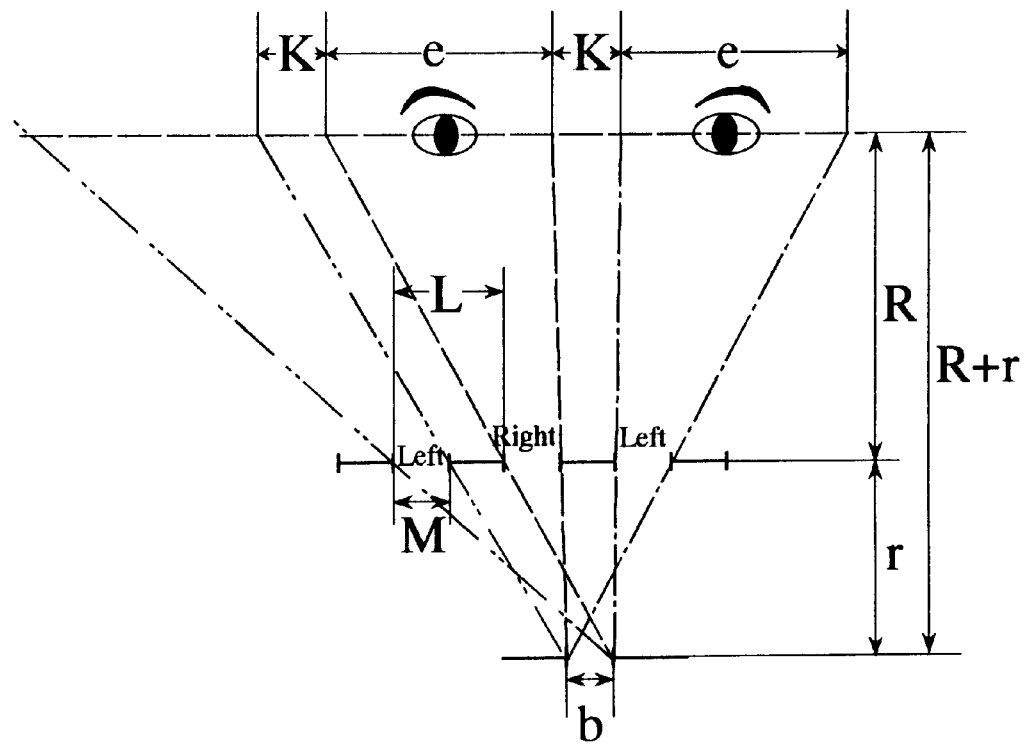
FIG. 13 is a schematic view for explaining the range of view in the third embodiment of the present invention.

First, if the range e is not less than zero nor more than the distance between observer's eyes E, light beams from the "right" and "left" pixels respectively reach the right eye and the left eye through the slits in the vertical striped filter 5 if both the eyes are within the range e, thereby to make it possible to view three-dimensional images, as shown in FIG. 13.

If both the eyes go out of the range e and enter a range K, which is a so-called black region which light beams from both the pixels do not reach, however, it is impossible to view three-dimensional images. e and K are respectively expressed by the following equations (9) and (10) from the relationship expressed by the equations (7) and (8):

$$e:R+rM/(M+b)=b:rb/(M+b) \quad (7)$$

$$K=E-e \quad (8)$$

$$e=\{bR+M(R+r)\}/r \quad (9)$$

$$K=\{(L-M)(R+r)-bR\}/r \quad (10)$$

The transverse range in which three-dimensional images can be viewed W is as expressed by the following equation $$W=e=\{bR+M(R+r)\}/r \quad (11)$$

Figure 14:
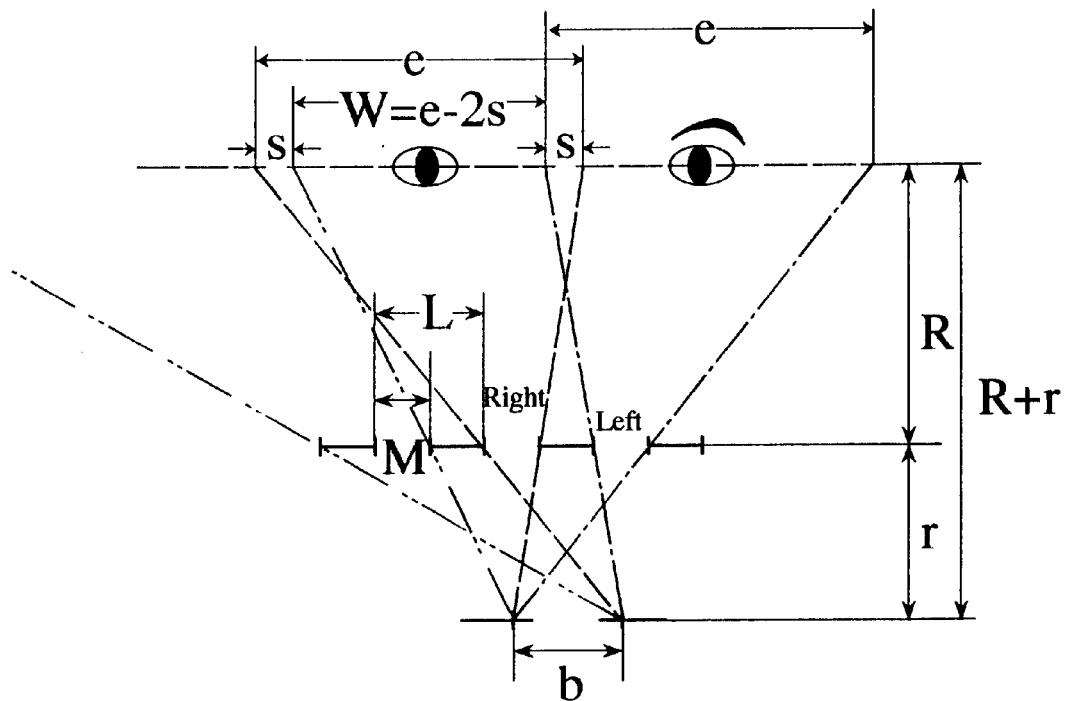
FIG. 14 is a schematic view for explaining the range of view in the third embodiment of the present invention.

If the range e is more than the distance between observer's eyes E and is not more than two times the distance between observer's eyes E, the same relational expression as the foregoing equation (9) holds with respect to the range e, as shown in FIG. 14.

A range s in FIG. 14 is a crosstalk region. If the eyes enter the crosstalk region, both "right" and "left" pixels can be seen, thereby to view a double image:

$$s=e-E \quad (12)$$

$$\therefore s=\{bR-(L-M)(R+r)\}/r \quad (13)$$

In FIG. 14, the range s is expressed by the foregoing equations (12) and (13), whereby the transverse range in which three-dimensional images can be viewed W is as expressed by the following equation (14):

$$W = e - 2s \quad (14)$$
$$= \{(2L - M)(R + r) - bR\}/r$$

Crosstalk can be seen in all positions if e=2s, whereby W becomes zero.

Figure 15:
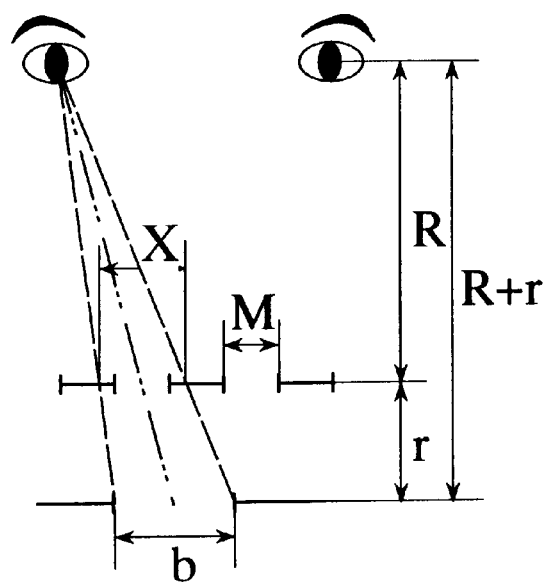
FIG. 15 is a structural drawing showing the relationship among the parameters used for explaining the principle of the third embodiment of the present invention.

As shown in FIG. 15, the range in which the eye in the proper viewing position faces the LCD panel through the slit in the vertical striped filter, that is, a range for view X is then expressed by the following equation (16) from the relationship expressed by the following equation (15):

$$X:r=b:(R+r) \quad (15)$$

$$X=bR/(R+r) \quad (16)$$

General expressions of the brightness of the LCD panel seen by the observer are divided depending on the value of the range for view X and are expressed as follows. The brightness in a state where the transverse aperture ratio of pixels is 100% and there is no vertical striped filter is defined as 1. (The brightness is M/L in a state where the transverse aperture ratio of pixels is M/L and there is no vertical striped filter).

First, if the region for view X is not less than zero and less than the aperture width of a pixel M, the above described brightness A is determined depending on the value of X, and is expressed by the following equation (17):

$$A=X/2L \quad (17)$$

If the region for view X is not less the M and less than (2L−M), the whole of the normal pixel is seen irrespective of the value of X, and the brightness A is expressed by the following equation (18):

$$A=M/2L \quad (18)$$

At this time, left and right images are completely separated from each other by the vertical striped filter, whereby the brightness A is one-half that in a case where there is no vertical striped filter.

Furthermore, if the region for view X is more than (2L−M) and not more than 2L, light beams from adjacent pixels (pixels at different viewpoints) enter the region for view X, whereby the brightness A is given by the following equation (19):

$$A=\{X-2(L-M)\}/2L \quad (19)$$

$$A=M/L \text{ when } X=2L.$$

Figure 16:
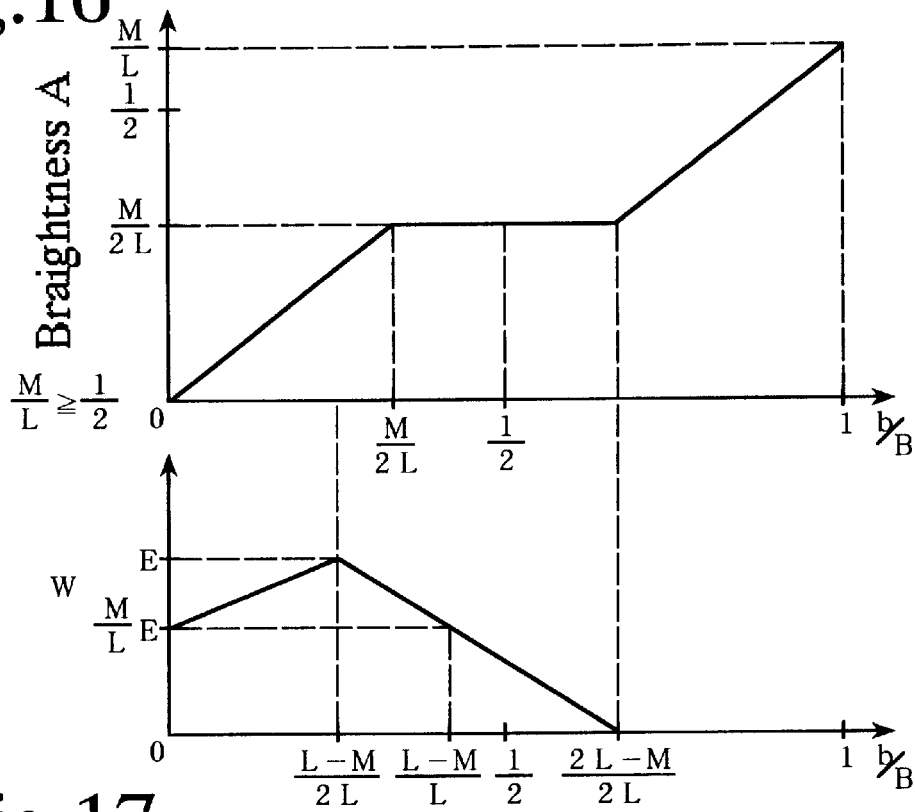
FIG. 16 is a characteristic view showing the relationship between the aperture ratio of slits in a vertical striped filter according to the present invention and the brightness of images and the relationship between the aperture ratio of the slits in the vertical striped filter and the transverse range in which three-dimensional images can be viewed.
Figure 17:
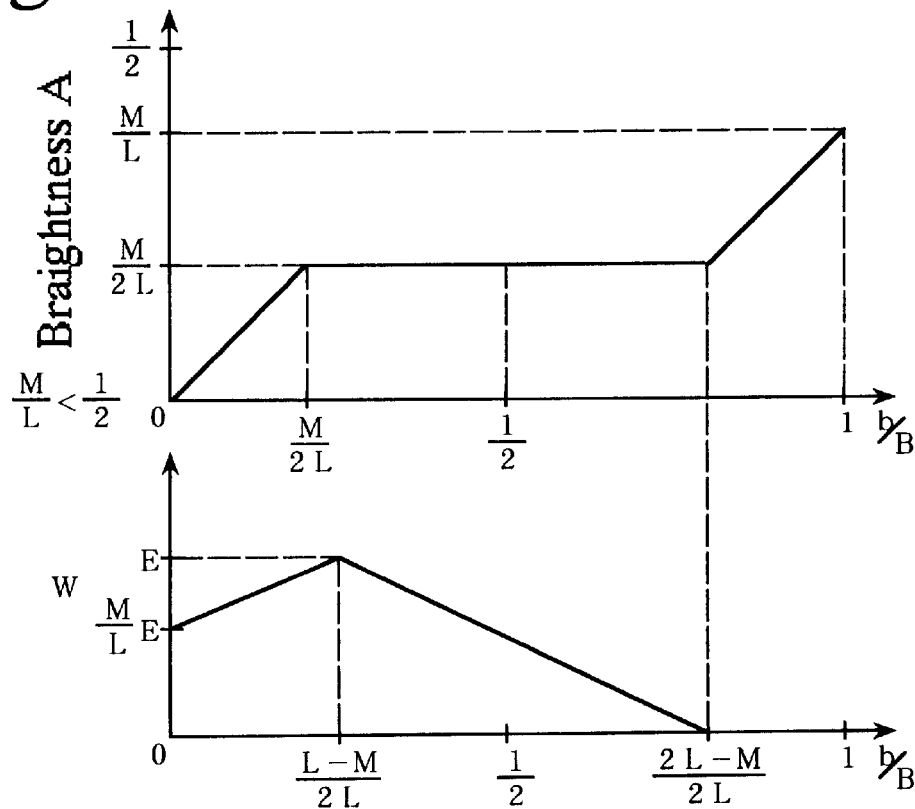
FIG. 17 is a characteristic view showing the relationship between the aperture ratio of slits in a vertical striped filter according to the present invention and the brightness of images and the relationship between the aperture ratio of the slits in the vertical striped filter and the transverse range in which three-dimensional images can be viewed.

If the foregoing relationship is arranged using the above described general expressions with respect to a case where the aperture ratio of pixels (M/L) in the LCD panel is not less than one-half (50%) and a case where it is less than one-half, respective characteristic curves shown in FIGS. 16 and 17 are obtained.

Figure 18:
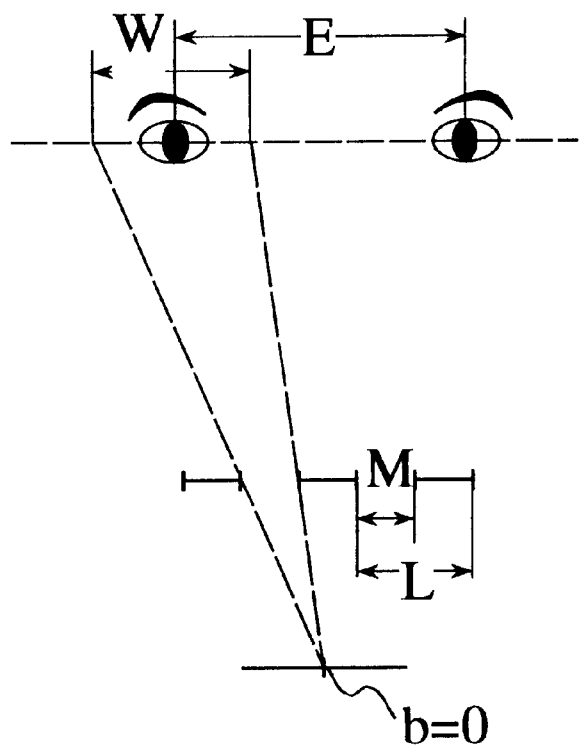
FIG. 18 is a structural drawing showing the relationship among the parameters used for explaining the principle of the third embodiment of the present invention.

When the aperture ratio of slits (b/B) in the vertical striped filter is zero, the vertical striped filter is not opened as shown in FIG. 18. Accordingly, light emitted from the LCD panel does not reach the eye, whereby the brightness A is zero. If it is considered that the LCD panel is seen from an infinitely small hole, the transverse range in which three-dimensional images can be viewed W exists, which is expressed by the following equation (20):

$$W=EM/L \quad (20)$$

Furthermore, if the aperture ratio of the slits (b/B) in the vertical striped filter is more than zero, the state shown in FIG. 13 occurs. Accordingly, the range W is expressed by the following equation (21), similarly to the foregoing equation (11):

$$W=\{bR+M(R+r)\}/r \quad (21)$$

Since the region for view X is not less than zero and less than the aperture width of a pixel M, the brightness in the proper viewing position is expressed by the following equation (22) from the foregoing equations (16) and (17):

$$A=X/2L=b(r+R)/2RL \quad (22)$$

Figure 20:
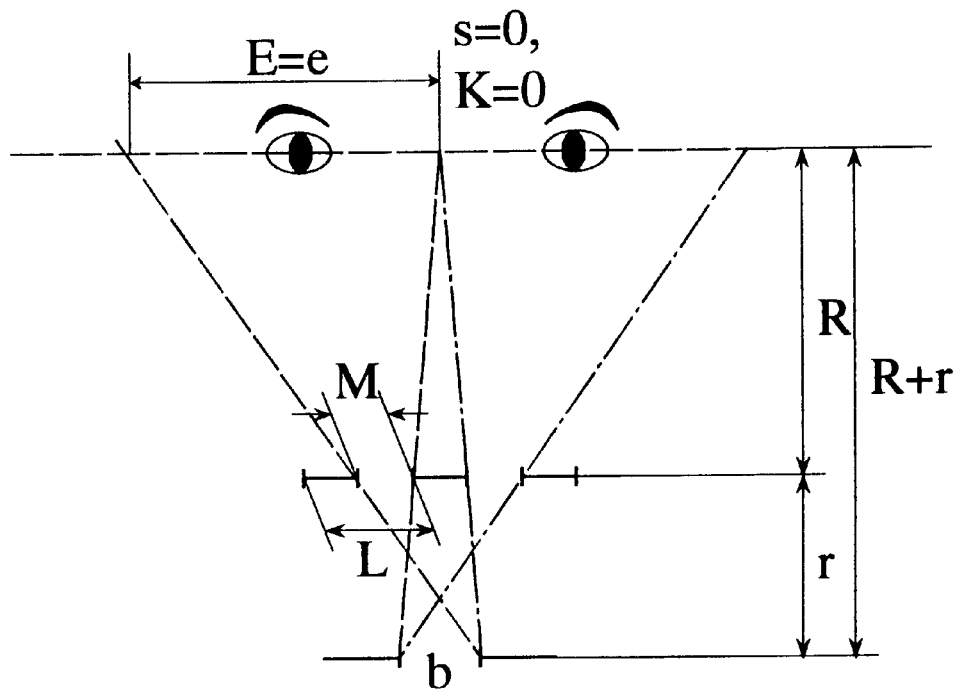
FIG. 20 is a structural drawing showing the relationship among the parameters used for explaining the principle of the third embodiment of the present invention.

Furthermore, when the aperture ratio of the slits (b/B) in the vertical striped filter is (L−M)/2L, e=E, which is a state intermediate between FIG. 13 and FIG. 14, that is, a state shown in FIG. 20. At this time, K in the foregoing equation (10) and s in the foregoing equation (13) are respectively zero, and W in the foregoing equation (11) or the foregoing equation (14) are equal to E.

These are the conditions under which black and crosstalk disappear, and the transverse range in which three-dimensional images can be viewed is maximum.

A region where the aperture ratio of the slits (b/B) in the vertical striped filter is more than (L−M)/2L is a region where crosstalk appears, which is as shown in FIG. 14. In this case, the transverse range in which three-dimensional images can be viewed W is expressed by the following equation (23), similarly to the foregoing equation (14):

$$W=\{(2L-M)(R+r)-bR\}/r \quad (23)$$

Figure 19:
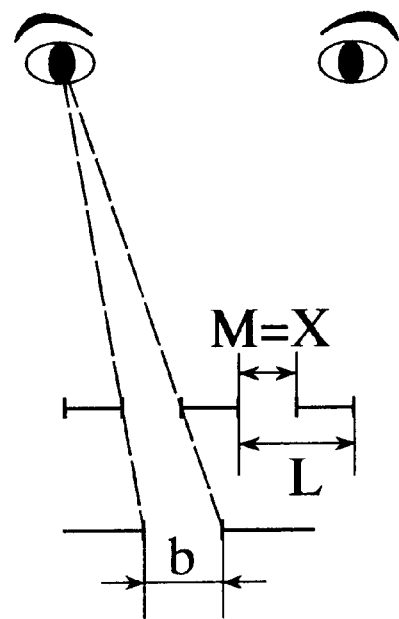
FIG. 19 is a structural drawing showing the relationship among the parameters used for explaining the principle of the third embodiment of the present invention.

Furthermore, when the aperture ratio of the slits (b/B) in the vertical striped filter is M/2L, X=M, which is a state shown in FIG. 19. The brightness A is as expressed by the following equation (24), similarly to the foregoing equation (18):

$$A=M/2L \quad (24)$$

Thereafter, while a state where the region for view X is more than M and not more than (2L−M) is satisfied, the brightness A remains in a state expressed by the forgoing equation (24).

If the aperture ratio of the slits (b/B) in the vertical striped filter exceeds (2L−M)/2L, W=0, whereby the transverse range in which three-dimensional images can be viewed W reduces to zero. In this range, crosstalk arises even if the eye is in any position, whereby three-dimensional images cannot be no longer viewed.

If the aperture ratio of the slits (b/B) in the vertical striped filter becomes one, which is the same as a case where there is no vertical striped filter, the brightness becomes M/L.

If M/L exceeds 2/3, however, the following expression (25) is obtained:

$$M/2L > (L-M)/L \quad (25)$$

Therefore, at a point where the brightness is maximum, a transverse region where three-dimensional images can be viewed is smaller than a range in which three-dimensional images can be viewed by a lenticular lens method (ME/L). As a result, there is no advantage to the use of the vertical striped filter 5.

If the aperture ratio of the pixels is less than 50% (M/L<1/2), the large or small relationship between the conditions under which the brightness is saturated; b/B=M/2L and the conditions under which a transverse region where three-dimensional images can be viewed is maximum; b/B= (L−M)/2L is reversed, as shown in the characteristic curve of FIG. 17. In this case, therefore, M/L is small. Accordingly, the maximum brightness in the proper viewing position is small. However, it is possible to obtain the maximum brightness at a point where W is maximum.

As described in the foregoing, even when the vertical striped filter is arranged on the side of the light source with respect to the display panel, the conditions under which a region where three-dimensional images can be viewed is wider than that in a lenticular lens method and a certain degree of brightness is ensured are the following three patterns:

(1) The aperture width of a pixel M in the display panel is not less than one-half and less than two-thirds the pixel pitch L, and the aperture ratio of slits in the vertical striped filter is approximately not less than (L−M)/2L nor more than M/2L.

(2) The aperture width of a pixel M in the display panel is less than one-half the pixel pitch L, and the aperture ratio of the slits in the vertical striped filter is approximately not more than (L−M)/2L.

(3) The aperture width of a pixel M in the display panel is not less than two-thirds the pixel pitch L, and the aperture ratio of the slits in the vertical striped filter is approximately more than (L−M)/2L and not more than (L−M)/L.

Although in the above described embodiment, description was made of a two-viewpoints type 3-D display method, as in the above described embodiment, the present invention is also applicable to a multiple-viewpoints(other than two-viewpoints) type autostereoscopic 3-D display method.

As shown in FIG. 5, in the case of the three-viewpoints type autostereoscopic 3-D display method, three images which differ in viewpoints are sequentially displayed in pixels in the display portion 2 of the LCD panel, and each of light beams from pixels "A", "B" and "C" reaches the right eye or the left eye of a observer depending on the position of the head of the observer. Further, as shown in FIG. 6, in the case of the four-viewpoints type autostereoscopic 3-D display method, four images which differ in viewpoints are sequentially displlayed in pixels in the display portion 2 of the LCD panel, and each of light beams from pixels "A", "B", "C" and "D" reaches the right eye or the left eye of a observer depending on the position of the head of the observer. Therefore, in the case of m (m is an integer of not less than three)-viewpoints type 3-D display method, images which differ in viewpoints are displayed in pixels 1 to m, whereby three-dimensional images can be viewed in a wider range, as compared with that in the two-viewpoints type 3-D display method, when the observer moves his or her head rightward or leftward.

Figure 21:
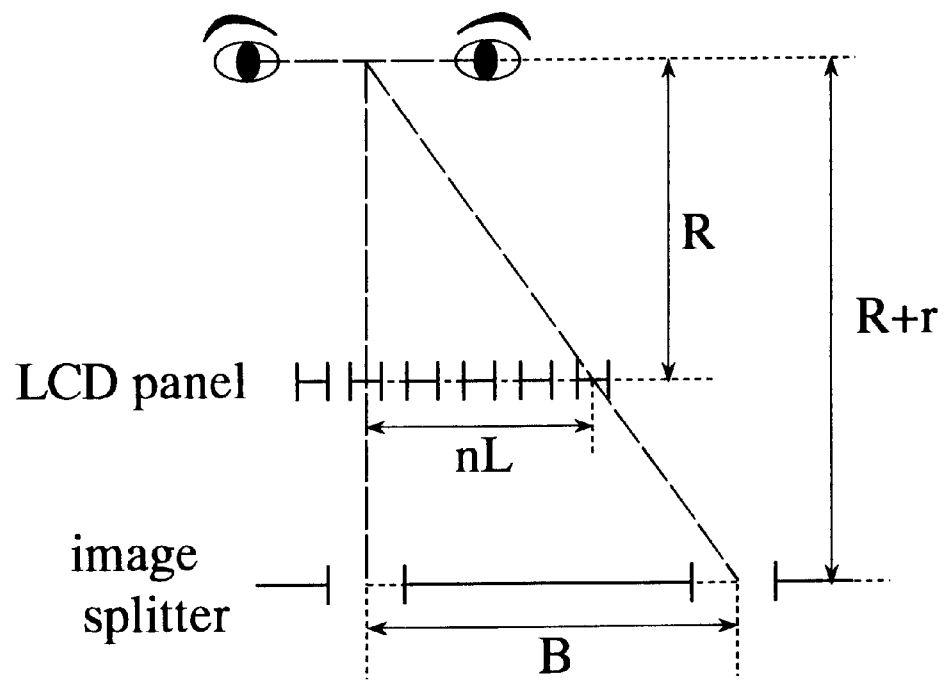
FIG. 21 is a structural drawing showing the relationship among the parameters in a case where the third embodiment of the present invention is used for an n-viewpoints type autostereoscopic 3-D display.

In an n (n is an integer of not less than two)viewpoints type 3-D display, therefore, a slit pitch in a case where a vertical striped filter 5 is arranged on the side of a light source of a display panel is as expressed by the following equations (26) and (27) from FIG. 21:

$$B:(R+r)=nL:R \quad (26)$$

$$B=nL(R+r)/R \quad (27)$$

Since all the aperture ratios of slits (b/B) in the above described conditions or the aperture ratio are 2/n, the conditions under which the range in which three-dimensional images can be viewed is wider than that in a lenticular lens method and a certain degree of brightness is ensured are the following three patterns in the case of the n (n is an integer of not less than two)-viewpoints type 3-D display:

(4) The aperture width of a pixel M in the display panel is not less than one-half and less than two-thirds the pixel pitch L, and the aperture ratio of slits in the vertical striped filter is approximately not less than (L−M)/nL nor more than M/nL.

(5) The aperture width of a pixel M in the display panel is less than one-half the pixel pitch L, and the aperture ratio of the slits in the vertical striped filter is approximately not more than (L−M)/nL.

(6) The aperture width of a pixel M in the display panel is not less than two-thirds the pixel pitch L, and the aperture ratio of the slits in the vertical striped filter is approximately more than (L−M)/nL and not more than 2 (L−M)/nL.

The above described embodiment will be specifically described with reference to the drawings.

Figure 22:
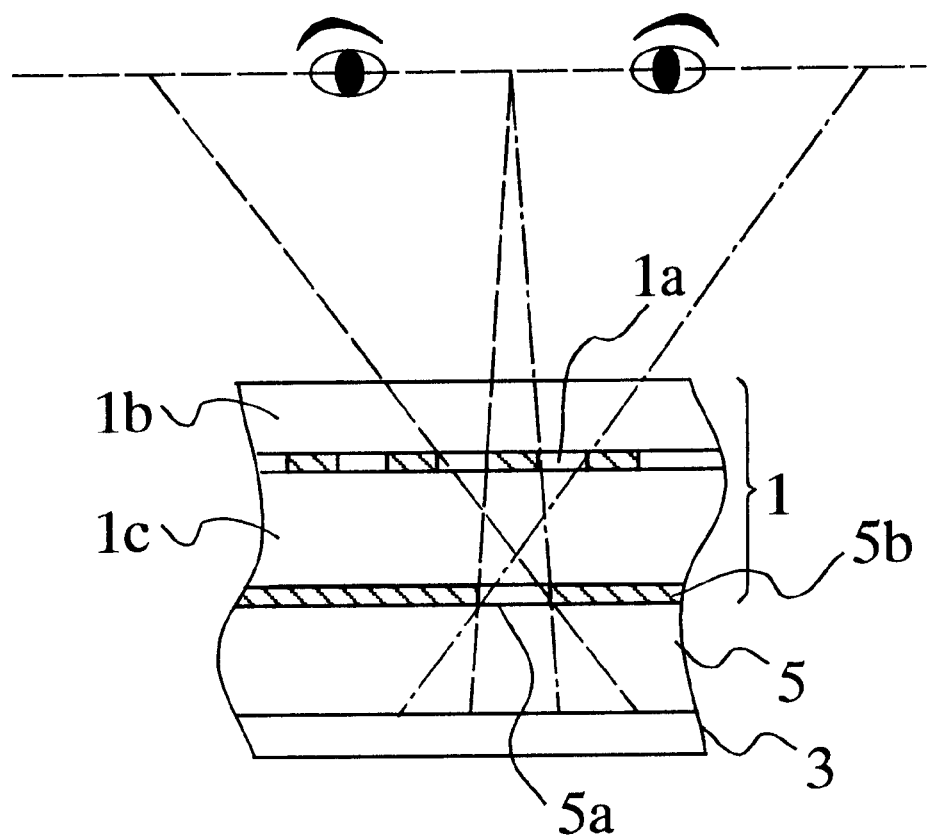
FIG. 22 is a schematic cross sectional view showing the specific construction of the third embodiment of the present invention.

As shown in a structural drawing of FIG. 22, the 3-D display according to the embodiment of the present invention comprises an LCD panel 1 and a vertical striped filter 5 provided on rear glass 1c on the side of a light source 3.

A transverse width M of a pixel slit 1a in the LCD panel 1 is set to not less than one-half and less than two-thirds a pitch L between pixel slits 1a, the aperture ratio of slits 5c in the vertical striped filter 5, that is, the ratio of an aperture width b of the slit 5c to a pitch B between the slits 5c (b/B) is set to (L−M)/nL.

According to the 3-D display thus constructed, three-dimensional images can be viewed is wider than that in a lenticular lens method, and a certain degree of brightness is obtained.

In the present embodiment, the aperture ratio of the slits 5c in the above described vertical striped filter 5 may be more than (L−M)/nL and not more than M/nL.

In another example of the embodiment of the present invention, the transverse aperture width of a pixel M in the LCD panel 1 is less than one-half the pixel pitch L, and the aperture ratio of the slits (b/B) in the vertical striped filter 5 is approximately not more than (L−M)/nL.

The other construction, function and effect of the present embodiment are the same as those in the above described embodiment and hence, the description thereof is not repeated so as to avoid overlapping.

In still another example of the embodiment of the present invention, the transverse aperture width of a pixel M in the LCD panel 1 is not less than two-thirds the pixel pitch L, and the aperture ratio of the slits (b/B) in the vertical striped filter 5 is approximately more than (L−M)/nL and not more than 2 (L−M)/nL.

The other construction, function and effect of the present embodiment are the same as those in the above described embodiment and hence, the description thereof is not repeated so as to avoid overlapping.

As described in the foregoing, according to the present invention, the aperture ratio of the slits in the vertical striped filter is set as described above on the basis of the transverse aperture width of a pixel in the LCD panel having a pixel shape having at least black portions in a vertical stripe shape and the pixel pitch, thereby to obtain a 3-D display having a wider region where three-dimensional images can be viewed than that in a lenticular lens method.

Figure 23:
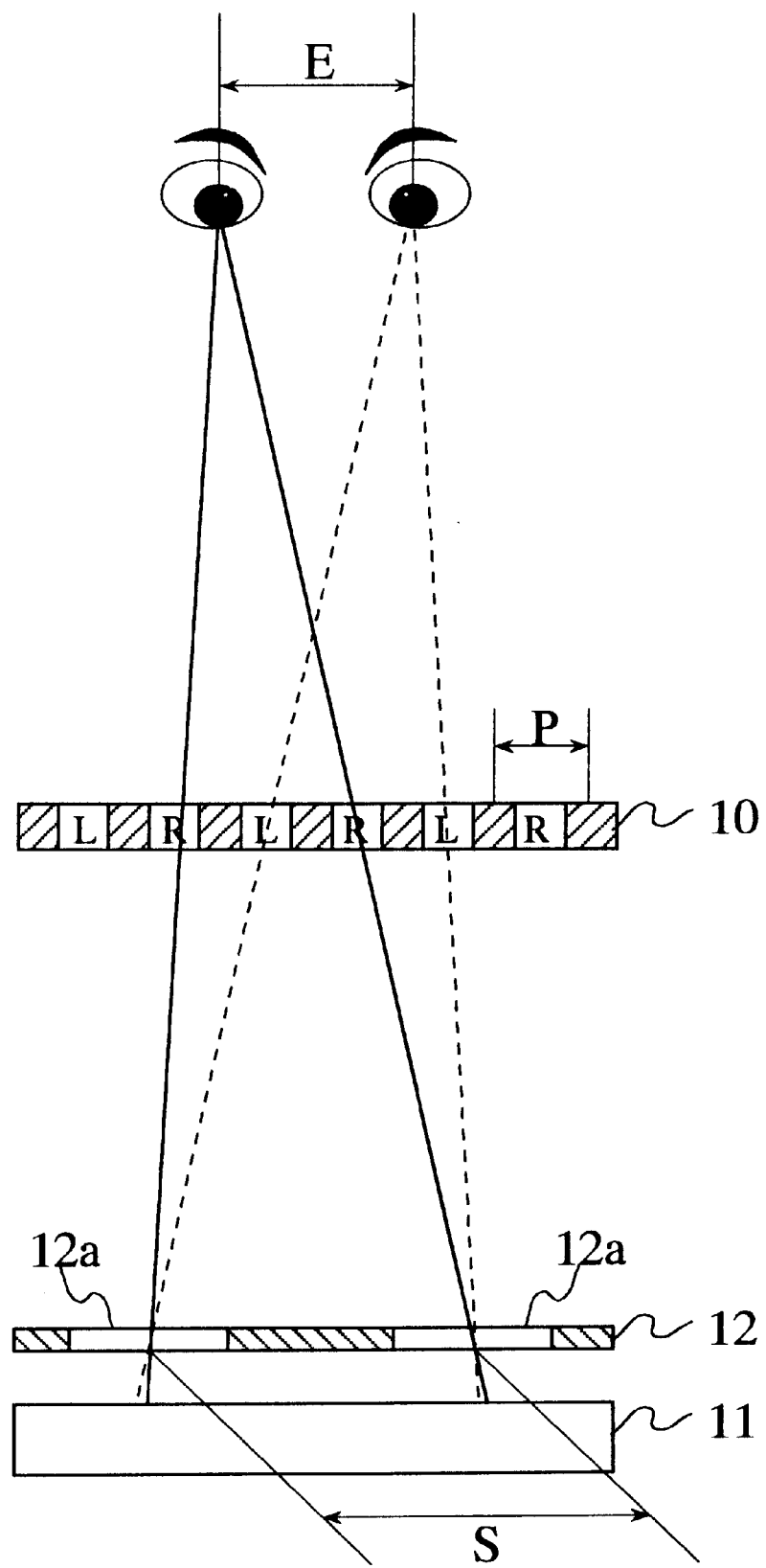
FIG. 23 is a schematic top view of the present invention.
Figure 24:
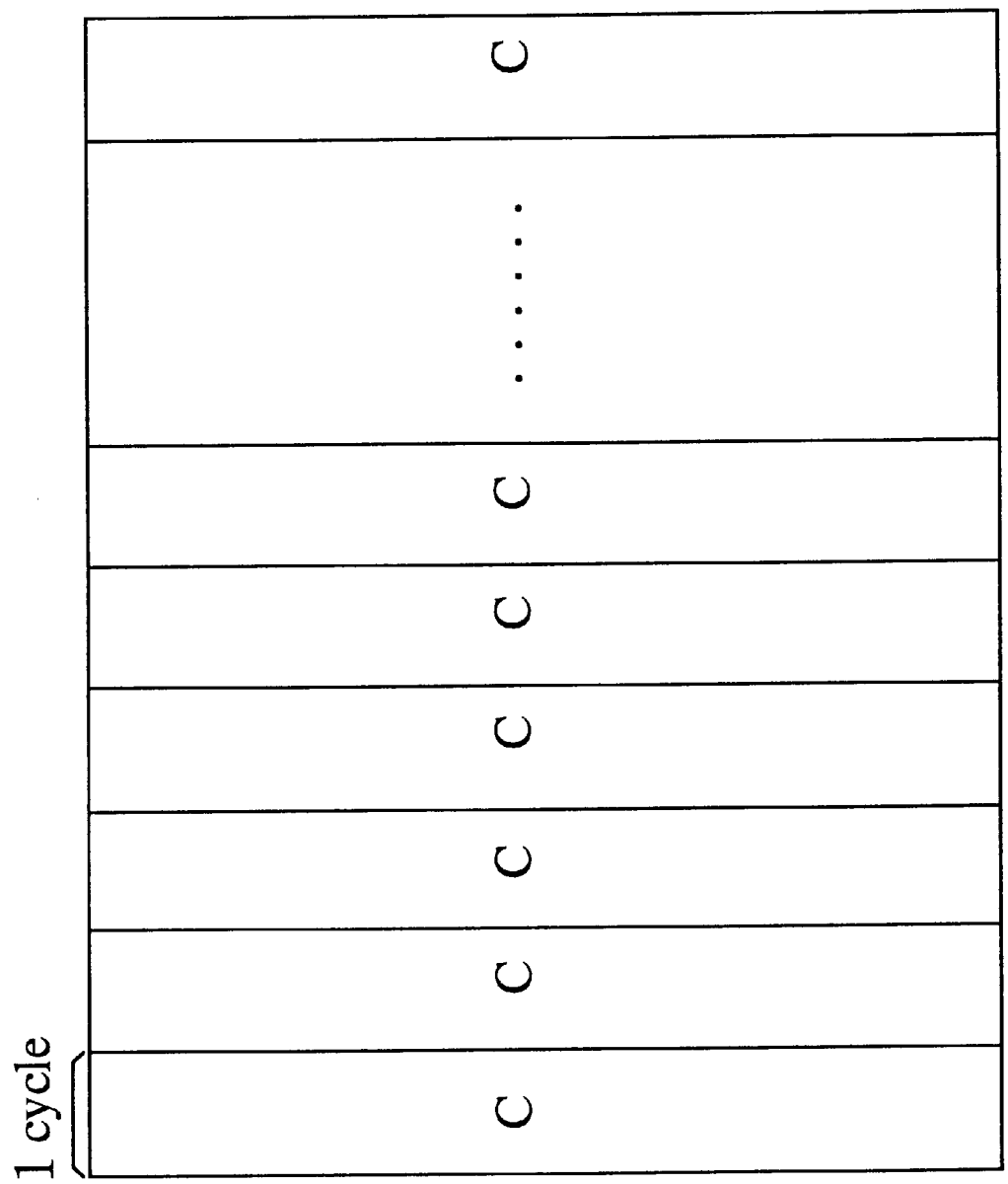
FIG. 24 is a schematic front view showing the vertical striped filter according to the present invention.

In a 3-D display without glasses for obtaining three-dimensional images by arranging a vertical striped filter between a light source and an LCD display as in the above described embodiments, a slit pitch S between slits 12a in a vertical striped filter 12 can be found by a distance between observer's eyes E and a pixel pitch P in accordance with the following equation (28), as shown in FIG. 23.

$$S = 2PE/(E-P) \qquad (28)$$

Conversely, the distance between observer's eyes E can be found from the slit pitch S between the slits 12a and the pixel pitch P in accordance with the following equation (29):

$$E = SP/(S-2P) \qquad (29)$$

As described in the foregoing, 65 mm is generally ideal as the distance between observer's eyes E. If the pixel pitch P in the above described LCD display 10 is 0.11 mm, an ideal slit pitch S in the vertical striped filter 12 becomes 0.220372 . . . mm by the foregoing equation (28).

Examples of a method of manufacturing the above described vertical striped filter include a method utilizing a laser and a method utilizing a printing technique. In the method utilizing a laser, the steps of applying a high-resolution photosensitive emulsion over thicknesses of 2 to 3 μm of a glass substrate, irradiating a barrier forming portion by a laser beam to blacken the barrier forming portion, and removing the high-resolution photosensitive emulsion in a portion which is not blackened are employed. The spot diameter of the laser beam is approximately 0.002 mm, and the position for irradiation can be controlled in units of 0.001 mm (1 μm) or 0.0001 mm (0.1 μm). On the other hand, in the method utilizing a printing technique, the same method as printing of a conductor on a printed circuit board is employed, thereby to make it possible to form barriers with a precision of approximately 0.01 mm (10 μm).

In the case of a 3-D display without glasses having a small screen, a pixel pitch is small, thereby to make it difficult to form a vertical striped filter having an ideal barrier pitch.

For example, in the method using a laser, even if an attempt to form a vertical striped filter having a barrier pitch of 0.22037 mm adapted to a screen having a pixel pitch of 0.11 mm is made when the position for irradiation is controlled in units of 1 μm, a parallax barrier having a barrier pitch of 0.221 mm larger than an ideal value or a vertical striped filter having a barrier pitch of 0.220 mm smaller than the ideal value can be only manufactured. Accordingly, the distance between observer's eyes E increases to infinity or becomes 24.3 mm if it is operated by the foregoing equation (29), thereby to make it impossible to view three-dimensional images.

In a case where the position for irradiation of the laser is controlled in units of 0.1 μm to manufacture a vertical striped filter, a vertical striped filter having a barrier pitch of 0.2204 mm can be formed. In this case, however, the manufacturing cost of the vertical striped filter is significantly high, and the distance between observer's eyes E operated by the foregoing equation (28) becomes approximately 60 mm. If the distributions of light beams in portions in the vicinity of right and left convergent points with respect to right and left 1000 pixels are found by simulation, taking the pixel pitch as 0.110 mm, the distance between the screen and the barriers as 0.85 mm and the barrier pitch as 0.2204 mm, the convergent points of the light beams are significantly shifted from an ideal convergent point.

If a vertical striped filter having a barrier pitch of 0.22037 mm close the ideal value can be manufactured, the distance between observer's eyes E obtained by back calculation using the foregoing equation (29) becomes 65.3 mm, and the convergent points are significantly closer to the ideal convergent point, thereby to make it possible to visually view three-dimensional images as in a case where an vertical striped filter having an ideal barrier pitch is used. However, it is extremely difficult to manufacture such a high-precision vertical striped filter.

As described in the foregoing, although the foregoing are theoretically possible, problems in manufacturing techniques and costs still exist also in the 3-D display without glasses by a slit light source method satisfying the ideal conditions.

The present embodiment has been made in view of the foregoing circumstances and has for its object to provide a vertical striped filter so adapted that three-dimensional images can be viewed even at a small pixel pitch and a direct view-type 3-D display without glasses using the vertical striped filter, although they are manufactured using the conventional manufacturing apparatus.

As described in the foregoing, a slit pitch S in the vertical striped filter used for the slit light source method is 0.22037 mm. Consequently, the whole of the vertical striped filter may be divided into a plurality of cycles C in a vertical stripe shape, to form barriers so that two types of slit pitches are mixed at random in each of the cycles C.

Figure 25:
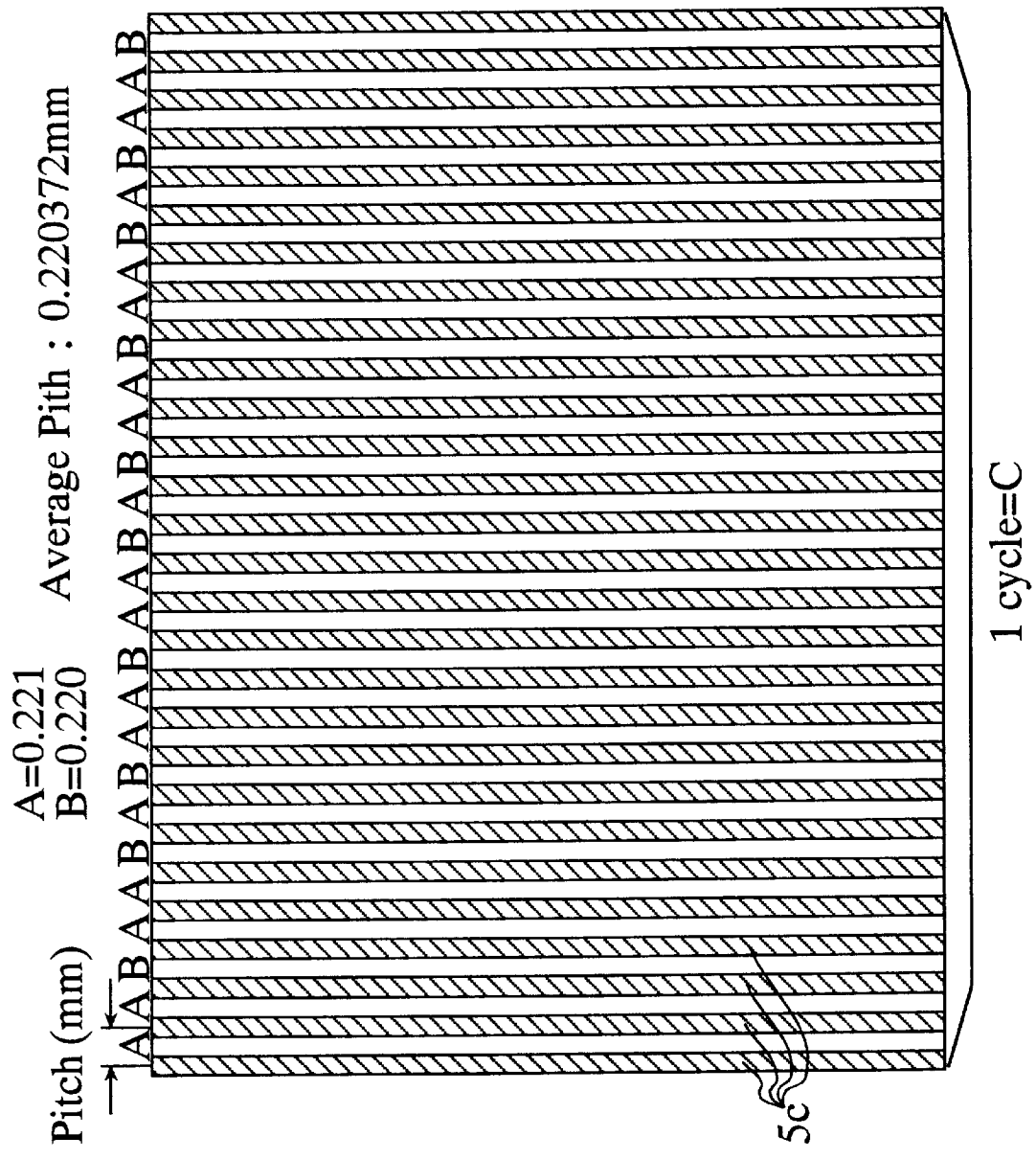
FIG. 25 is a schematic front view showing the vertical striped filter according to the present invention.

The whole of the vertical striped filter according to the embodiment of the present invention is divided into a plurality of cycles C in a vertical stripe shape, and barriers (portions painted out) 5c having two types of barrier pitches A and B mixed at random are formed in each of the cycles C, as shown in FIG. 25. The average barrier pitch in each of the cycles C is so determined as to be an ideal slit pitch S (0.22037 mm) operated from the distance between observer's eyes E (65 mm) and the pixel pitch P (0.11 mm), and the barriers 5c are formed in accordance with the ideal barrier pitch.

The barriers 5c are formed in the steps of applying a high-resolution photosensitive emulsion over thicknesses of 2 to 3 μm of a glass substrate, irradiating a barrier forming portion by a laser beam using a conventional laser device to blacken the barrier forming portion, and removing the high-resolution photosensitive emulsion in a portion which is not blackened. In this manufacturing method, if the position for irradiation of the laser beam is controlled in units of 0.1 μm, it is possible to form the barriers 5c with higher precision. Since in the present embodiment, the vertical striped filter is formed at particularly low cost, however, the position for irradiation is controlled in units of 1 μm.

A plurality of types of barrier pitches may be mixed in each of the cycles C. For example, three or more types of barrier pitches may be mixed in the cycle. In the present embodiment, however, two types of barrier pitches, for example, a barrier pitch A larger than an ideal value and closest to the ideal value which can be formed (0.221 mm in this case), and a barrier pitch B smaller than the ideal value and closest to the ideal value which can be formed (0.220 mm in this case) are combined with each other so as to simplify the control of the laser device.

If the two types of barrier pitches A and B are mixed in each of the cycles, it is possible to simply operate the mixture ratio by a method of calculating the values of two unknown quantities from their unit total and the total of one of their attributes. For example, if the barrier pitches A and B of 0.221 mm and 0.220 mm are mixed at random by the result of the calculation (37:63) or at a ratio close thereto (for example, 10:17), it is possible to manufacture a vertical striped filter having an average barrier pitch of 0.22037 mm.

Although the mixture ratio of the barrier pitches A and B is set to the result of the above described calculation (37:63), the two types of barrier pitches A and B of 0.221 mm and 0.220 mm are mixed at a ratio of 10:17 so as to decrease the horizontal width of each of the cycles C to increase the number of cycles to obtain high quality three-dimensional images in the range in which deviation of the average barrier pitch from the ideal barrier pitch can be substantially ignored, thereby to obtain a vertical striped filter in which the average barrier pitch is 0.22037 mm and the horizontal length of one cycle is 5.95 mm.

As shown in FIG. 25, with respect to the vertical striped filter in which two types of barrier pitches A and B of 0.221 mm and 0.220 mm are mixed at random at a ratio of 10:17, the distributions of light beams in the vicinity of right and left convergent points with respect to right and left 1000 pixels are and found by simulation, taking the pixel pitch as 0.110 mm and the distance between the screen and the barriers (a distance replaced by the air) as 0.85 mm. Consequently, the distance between the convergent points is approximately 65 mm. Therefore, it is confirmed that the vertical striped filter has the same function as that of a vertical striped filter having a slit pitch (a barrier pitch) equal to an ideal value.

If the vertical striped filter is arranged between an LCD panel having a pixel pitch of 0.11 mm and a light source, and right and left images which differ in viewpoints are formed on alternate pixels in the LCD panel and are directly viewed approximately 501 mm ahead of the LCD panel, it is possible to view high quality images giving a three-dimensional effect.

Although in the above described embodiment, the vertical striped filter is formed in the method using a laser device capable of controlling the position for irradiation in units of 1 μm, a vertical striped filter having an average barrier pitch of 0.220372 can be also manufactured by mixing two types of barrier pitches, that is, 0.2204 mm larger than an ideal value 0.220372 mm and 0.2203 mm smaller than the ideal value at random at a ratio of 18:7 if a laser device capable of controlling the position for irradiation in units of 0.1 μm is used. In this case, the horizontal length of one cycle becomes 5.51 mm. The same is true for the method using a printing technique. Specifically, if barrier pitches of 0.23 mm and 0.22 mm are mixed at a ratio of 1:26, a vertical striped filter in which the average barrier pitch is 0.22037 mm and the horizontal length of one cycle is 5.95 mm is obtained.

Furthermore, the present embodiment is also applicable to not only a vertical striped filter for separating two types of images as described above but also a vertical striped filter in a multi-viewpoints type autostereoscopic 3-D display without glasses so adapted as to separate not less than three types of images.

As described in the foregoing, the whole of the vertical striped filter according to the present invention is divided into a plurality of cycles in a vertical stripe shape, to form barriers so that slit pitches, that is, barrier pitches in each of the cycles are non-uniform, and the average barrier pitch becomes an ideal barrier pitch operated from a distance between observer's eyes and a pixel pitch. Accordingly, light beams passing between the barriers from pixels in an LCD panel almost converge on two convergent points with approximately the same spacing as the ideal distance between observer's eyes, as in the case of the ideal barrier pitch, and the variation in the barrier pitches in each of the cycles is ignored in view with the naked eye, thereby to perceive the same three-dimensional effect as that in a case where a vertical striped filter having an ideal barrier pitch is used.

Moreover, in the vertical striped filter according to the present invention, the barrier pitches in each of the cycles may be non-uniform, thereby to make it possible to mix barrier pitches which can be formed by the conventional manufacturing apparatus. Therefore, the vertical striped filter can have the same function as that of the vertical striped filter having an ideal barrier pitch using the conventional method utilizing a printing technique or a laser beam, which is significantly advantageous in terms of reducing costs.

Particularly in the vertical striped filter according to the present invention, if barrier pitches in each of the cycles are formed with a precision of 10 μm, the vertical striped filter can have the same function as that of the vertical striped filter having an ideal barrier pitch using the method utilizing a printing technique significantly lower in cost than that in the method utilizing a laser beam, which is more advantageous in terms of reducing costs.

In the 3-D display without glasses according to the present invention, the vertical striped filter according to the present invention is arranged between the flat light source and the LCD panel. Therefore, light beams passing between the barriers from the pixels in the LCD panel converge on two convergent points with approximately the same spacing as the ideal distance between observer's eyes, as in the case of the ideal barrier pitch, and the variation in the barrier pitches in each of the cycles is ignored in view with the naked eye, thereby to perceive the same three-dimensional effect as that in a case where the vertical striped filter having an ideal barrier pitch is used.

Furthermore, the above described vertical striped filter is manufactured using the conventional method utilizing a printing technique or the conventional method utilizing a laser beam, which is advantageous in terms of reducing costs. Particularly, a case where the method utilizing a printing technique is used is more advantageous in terms of reducing costs.

An object of a fourth embodiment of the present invention is to provide a 3-D display so adapted that the range in which three-dimensional images can be viewed at the maximum illuminance can be enlarged without increasing a crosstalk region.

The embodiment of the present invention will be described with reference to the drawings.

Figure 26:
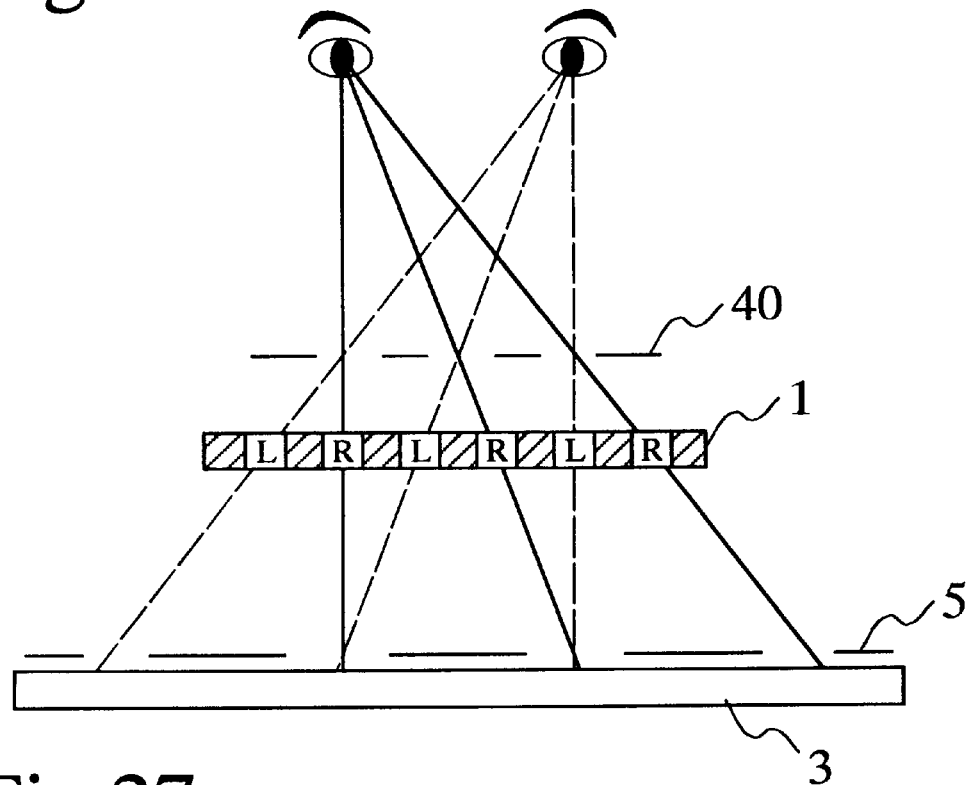
FIG. 26 is a schematic view showing the construction of a fourth embodiment of the present invention.

A 3-D display according to one embodiment of the invention shown in FIG. 26 comprises a light source 3, an LCD panel 1, a vertical striped filter 40 serving as a parallax barrier arranged ahead of the LCD panel 1, that is, on the side of a observer with respect to the LCD panel 1, and a vertical striped filter 5 arranged on the side of the light source 3 with respect to the LCD panel 1.

In order to increase the utilization factor of light emitted from the light source 3, the center of the pupil of the observer, the center of each of slits in the vertical striped filter 40, the center of each of pixels in the LCD panel 1, and the center of each of slits in the vertical striped filter 5 are so located as to be all arranged on one straight line.

Figure 27:
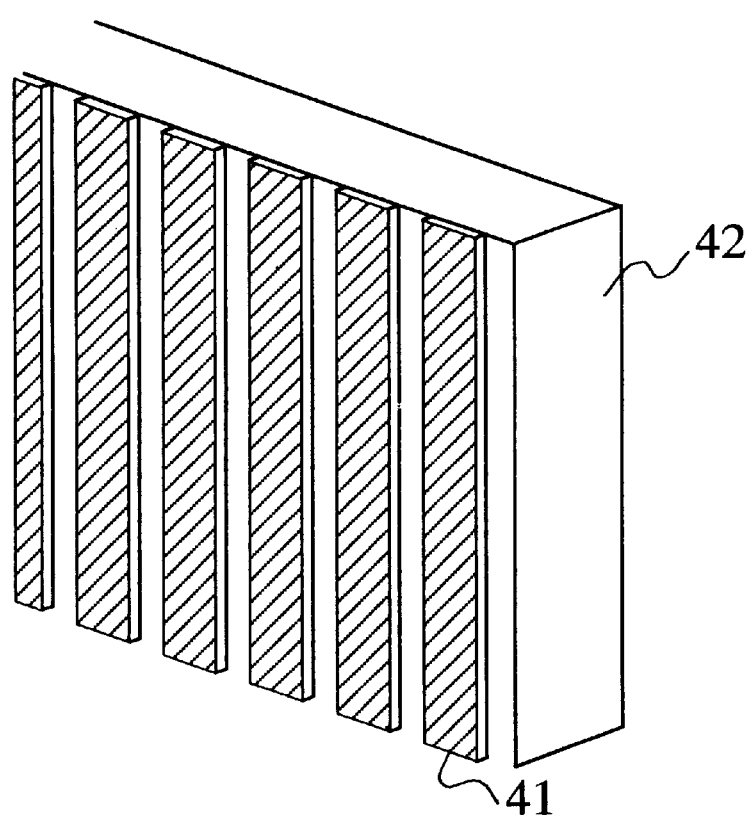
FIG. 27 is a perspective view showing a vertical striped filter on the side of a light source in the fourth embodiment of the present invention.

As shown in FIG. 27, the vertical striped filter 5 on the side of the light source is so constructed that stripe-shaped barriers 41 are formed on a glass photographic plate 42, and is formed, for example, by applying a photosensitive emulsion, exposing the photosensitive emulsion by a laser to blacken the same in a stripe shape and removing a non-sensitized portion or performing screen printing.

Both the aperture ratio of the slits in the vertical striped filter 40 on the side of the observer and the aperture ratio of the slits in the vertical striped filter 5 on the side of the light source are set to 50%, and the aperture ratio of the pixels in the LCD panel 1 is set to not less than 50%.

Figure 28:
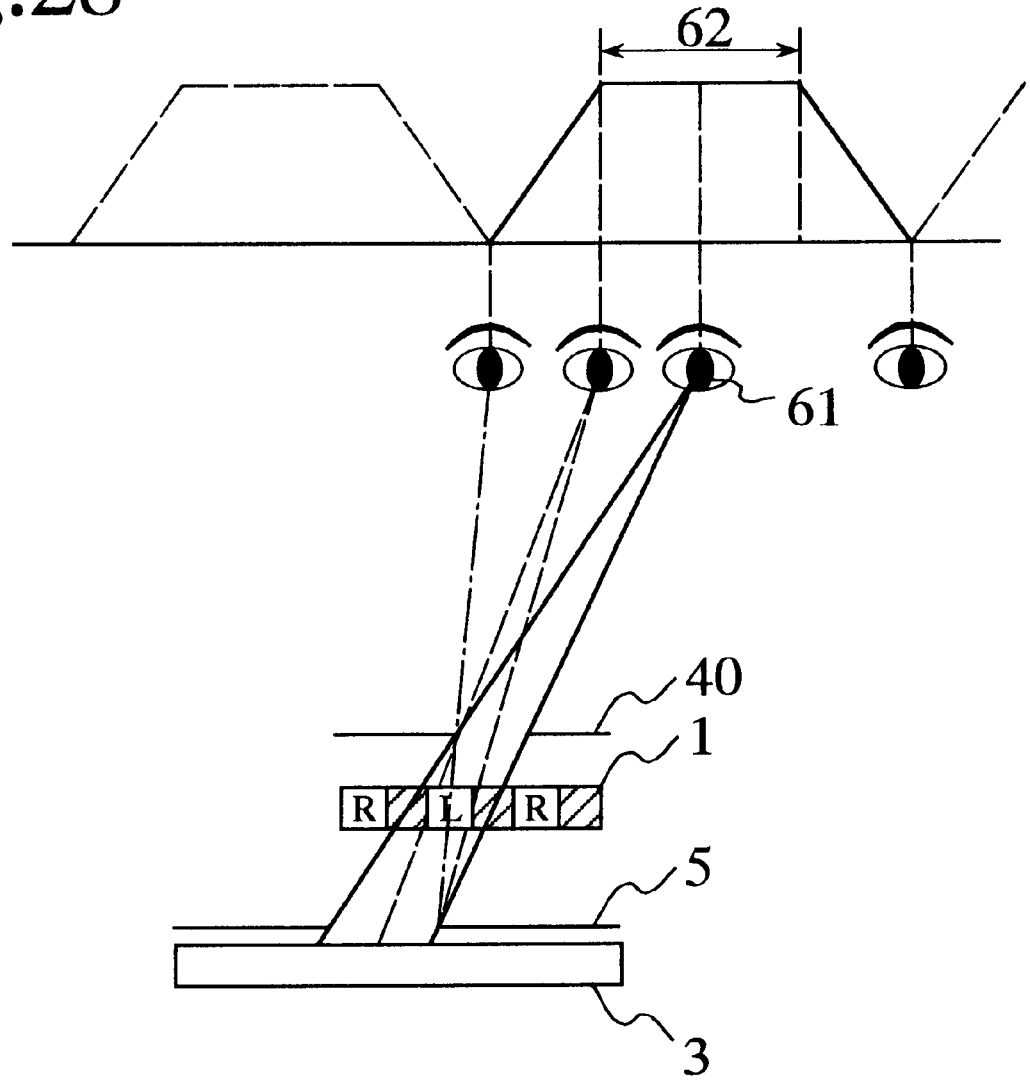
FIG. 28 is a schematic view for explaining the characteristics of the fourth embodiment; vertical striped filter on the side of a light source in the present invention.

As shown in FIG. 28, the relationship between the position of the pupil of the observer and the illuminance in a case where the observer is moved rightward or leftward from an optimum viewing position 61 is such that the maximum illuminance is obtained in the range of approximately 50% on the right and left sides from the optimum viewing position 61 in the range in which a left eye image L is viewed, as indicated by a solid line, for example, and the illuminance is linearly decreased on both sides of the range.

If the observer is further largely moved rightward or leftward from the optimum viewing position 61, a right eye image R is viewed in accordance with the same illuminance distribution subsequently to the range in which the left eye image L is viewed, whereby the maximum illuminance is obtained without a crosstalk region, and the range in which the maximum illuminance is obtained is increased, unlike the conventional method.

Figure 29:
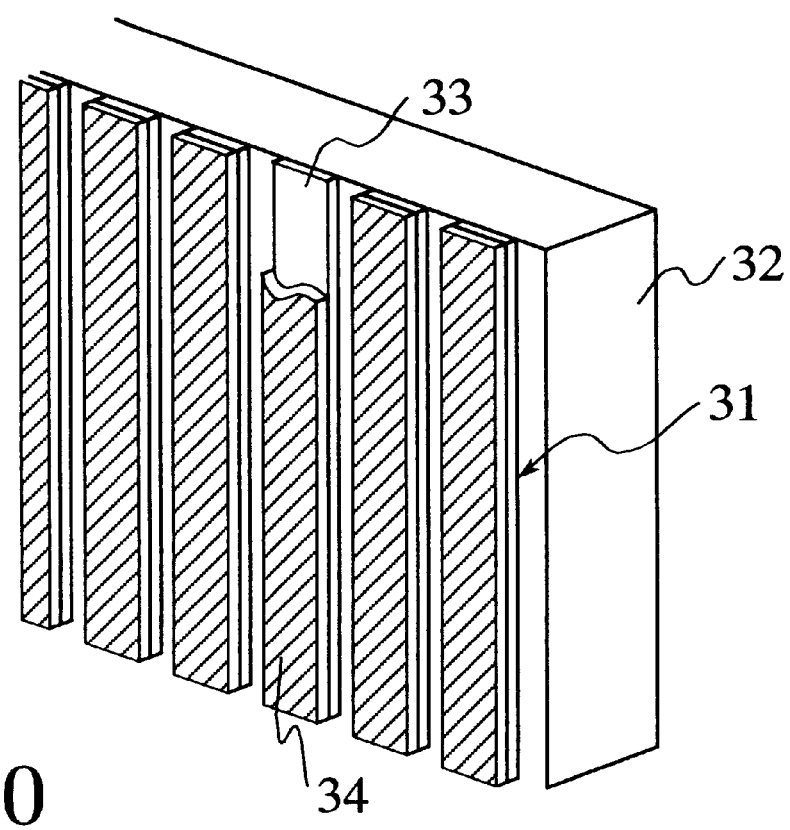
FIG. 29 or FIG. 30 is a perspective view showing still another vertical striped filter on the side of a light source in the present invention.
Figure 30:
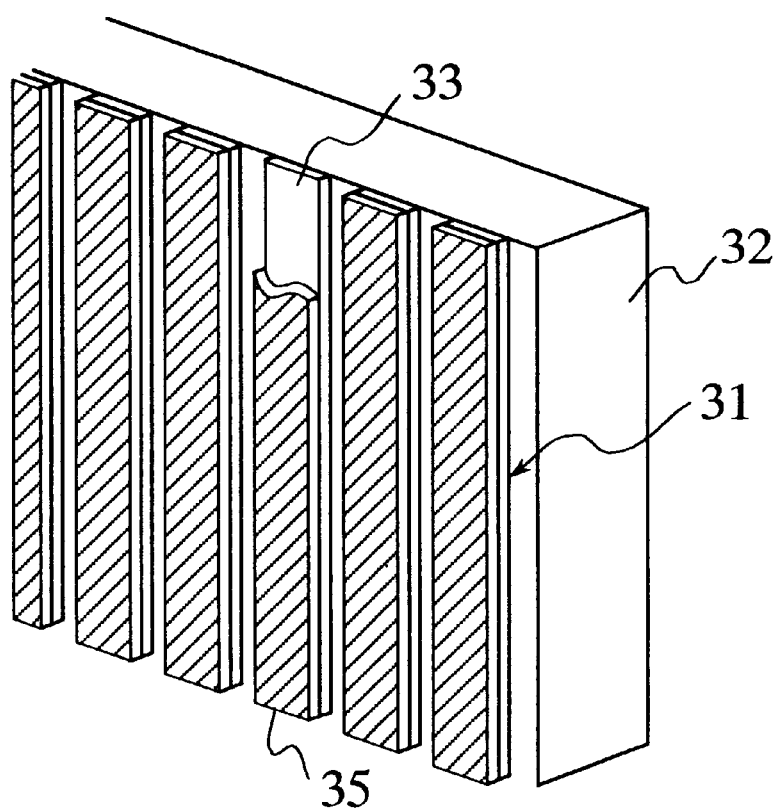

In the above described embodiment, examples of the vertical striped filter 5 on the side of the light source which can be used include a vertical striped filter obtained by laminating an aluminum thin film 33 and a chromium thin film 34 on a glass substrate 32 and etching them in a stripe shape, as shown in FIG. 29, and a vertical striped filter obtained by laminating an aluminum thin film 33 and a chromium oxide thin film 35 on a glass substrate 32 and etching them in a stripe shape, as shown in FIG. 30.

Figure 31:
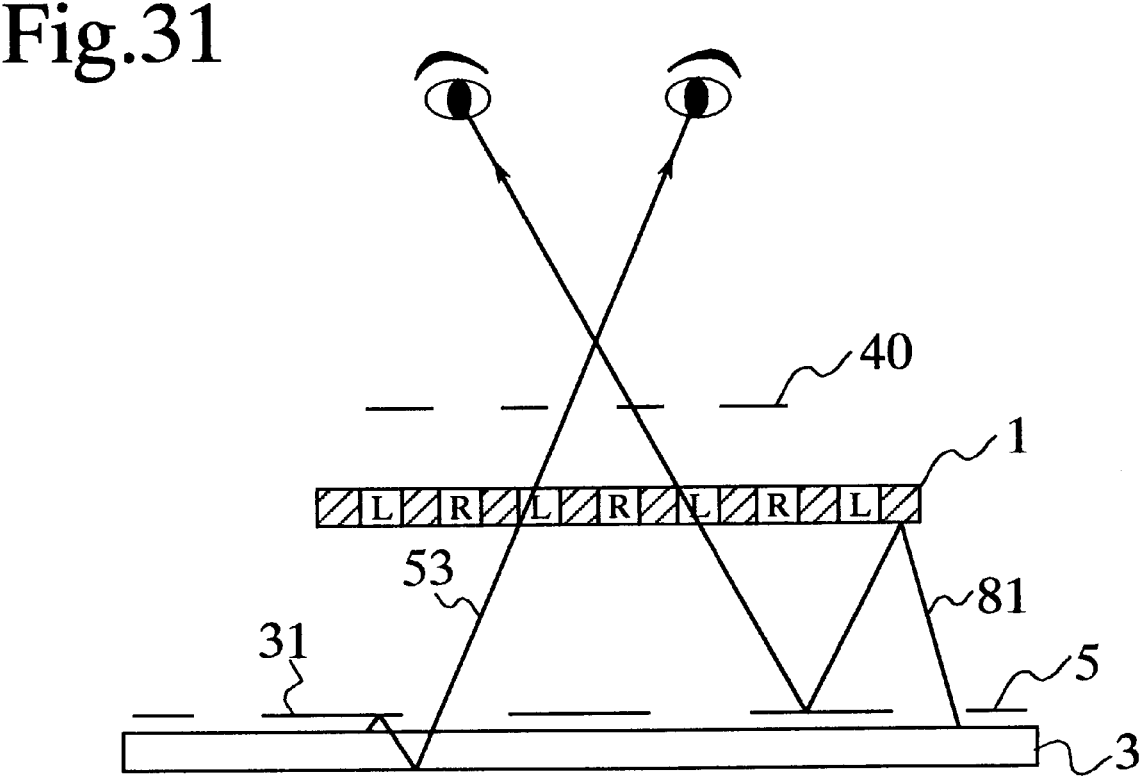
FIG. 31 is a schematic view showing a further vertical striped filter on the side of a light source and a vertical striped filter on the side of a observer in the present invention.

If the vertical striped filter 5 on the side of the light source shown in FIG. 29 or 30 is used, the vertical striped filter 5 on the side of the light source is so arranged that the aluminum thin film 33 is directed toward the light source 3. As shown in FIG. 31, a light beam 53 incident on a barrier 31 from the light source 3 is introduced into a slit between barriers 31 in the vertical striped filter 5 while being repeatedly reflected toward the light source 3 and reflected on a reflecting surface in the light source 3, thereby to increase the utilization factor of the light to increase the illuminance in the position for view.

Furthermore, the chromium thin film 34 and the chromium oxide thin film 35 absorb a light beam 81 emitted from the light source 3 and reflected from the LCD panel 1, to prevent the light beam 81 from being irregularly incident on the LCD panel 1 again and consequently, prevent adverse effects such as the muddiness of color, the decrease in contrast and the turbulence in an image.

The aluminum thin film 33 may be replaced with white ink, in which case the same effect can be obtained.

Figure 32:
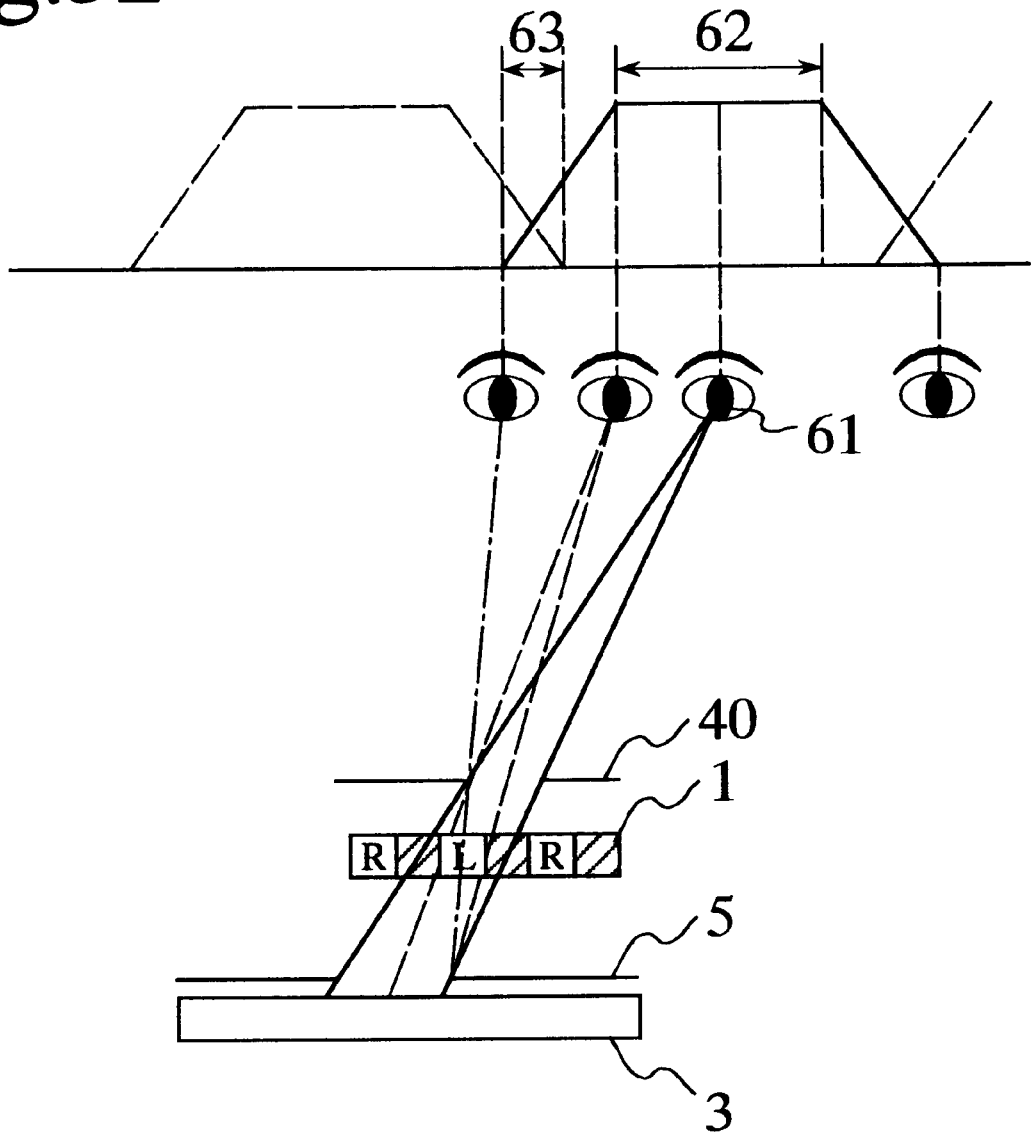
FIG. 32 is a schematic view for explaining the characteristics of another embodiment of the present invention.

In a 3-D display according to another embodiment of the present invention shown in FIG. 32, both the aperture ratio of slits in a parallax barrier 3 and the aperture ratio of slits in a vertical striped filter 5 are set to $(1/L) \times 100\%$, where L is a pixel pitch in an LCD panel 1 and l is an aperture width of a pixel, and the aperture ratio of pixels in the LCD panel 1 is set to not less than 50%.

The other construction, function and effect of the present embodiment are the same as those in the above described embodiment and hence, the description thereof is not repeated so as to avoid overlapping.

In the present embodiment, both the aperture ratio of slits in a vertical striped filter 40 on the side of a observer and the aperture ratio of the slits in the vertical striped filter 5 on the side of the light source are more than 50%. If the observer is moved rightward or leftward from an optimum viewing position 61, as shown in FIG. 32, therefore, a crosstalk region 63 with a right eye image R occurs in a region where the illuminance of a left eye image L is decreased, for example. If the crosstalk region 63 is made equal to that of the conventional parallax barrier method, however, a region where the maximum illuminance is obtained 62 becomes larger than the conventional one.

Figure 33:
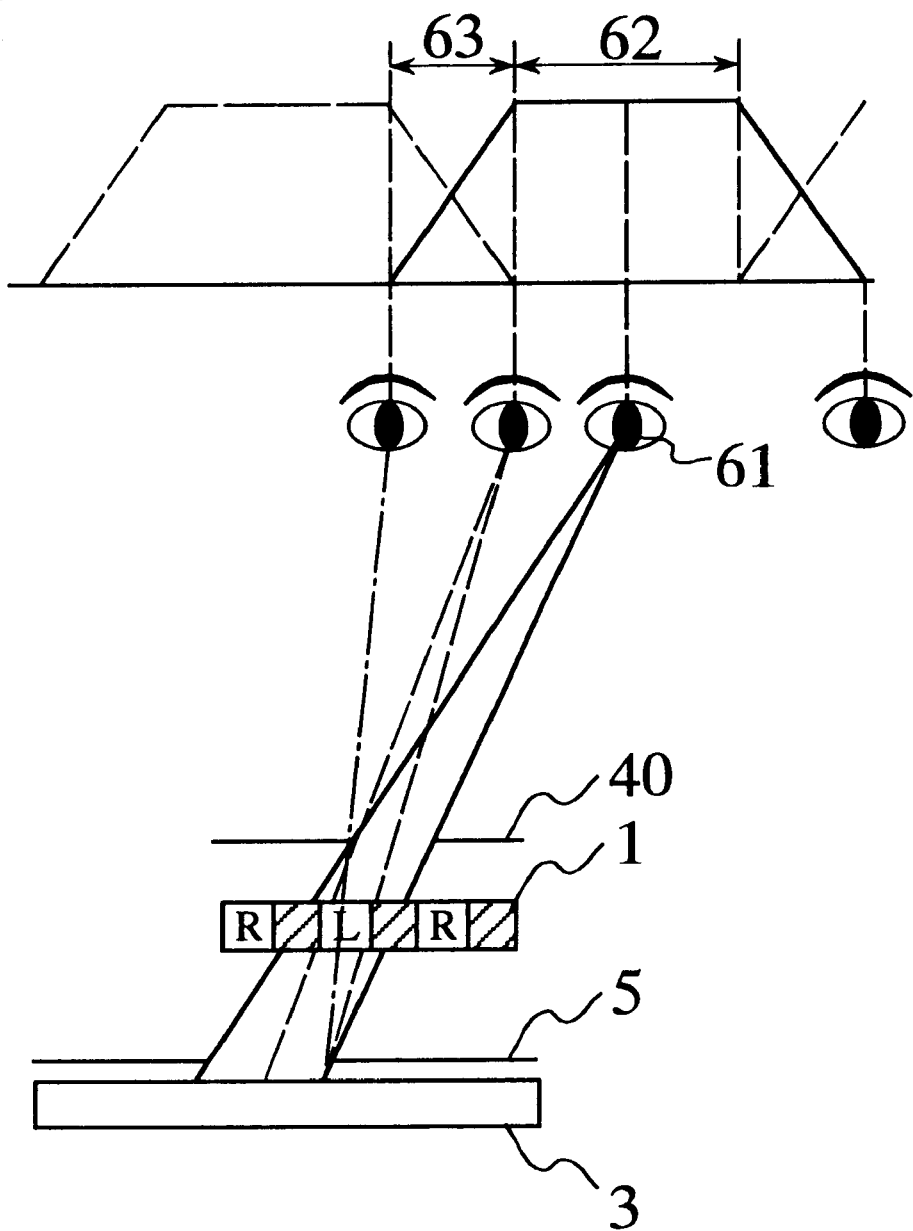
FIG. 33 is a schematic view for explaining the characteristics of still another embodiment of the present invention.
Figure 34:
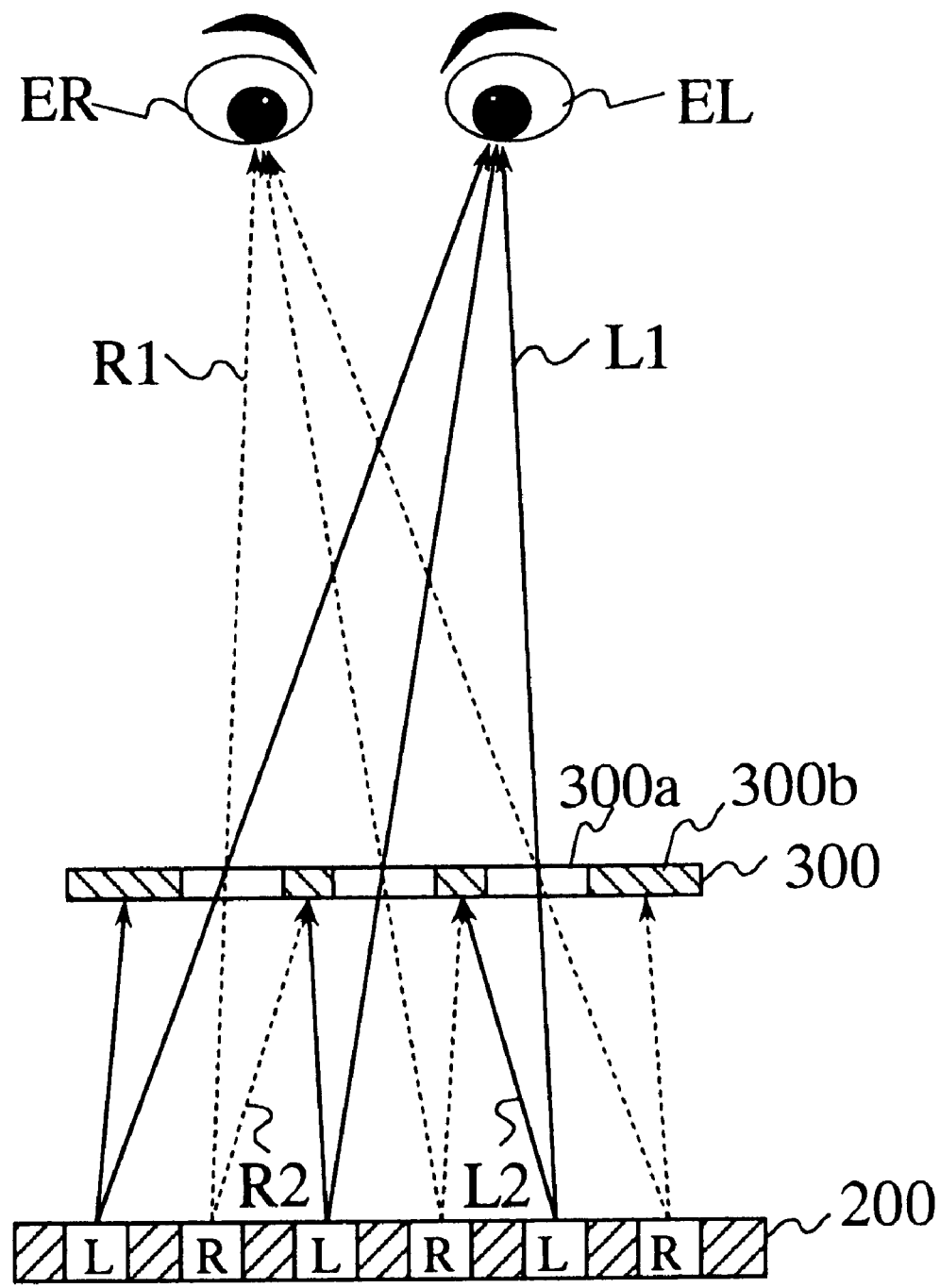
FIG. 34 is a structural drawing showing the principle of a conventional 3-D display by a parallax barrier method.

In still another embodiment of the present invention shown in FIG. 33, both the aperture ratio of slits in a vertical striped filter 40 on the side of a observer and the aperture ratio of slits in a vertical striped filter 5 on the side of a light source are set in the neighborhood of $\{(1+2L)/4L)\} \times 100\%$, where L is a pixel pitch in an LCD panel 1 and l is an aperture width of a pixel, and the aperture ratio of pixels in the LCD panel 1 is set to not less than 50%.

The other construction, function and effect of the present embodiment are the same as those in the above described embodiments and hence, the description thereof is not repeated so as to avoid overlapping.

In the present embodiment, if the observer is moved rightward or leftward from an optimum viewing position 61, the range in which a left eye image L (a right eye image R) can be viewed at the maximum illuminance by the left eye (the right eye) of the observer is larger than that of the conventional parallax barrier method, and there arises crosstalk between a region where the illuminance of the left eye image L (the right eye image R) is decreased and a region where the illuminance of the right eye image L (the left eye image R) is increased. Even if the observer is moved rightward or leftward from the optimum viewing position 61, therefore, the whole illuminance in the positions of the pupils of the observer, that is, the sum of the illuminance of the left eye image L and the illuminance of the right eye image R is not changed.

In the above described respective embodiments, the aperture ratio of the slits in the vertical striped filter 40 on the side of the observer and the aperture ratio of the slits in the vertical striped filter 5 on the side of the light source are made equal to each other. The reason is that this is most favorable in terms of increasing the utilization factor of light, thereby not to prevent the aperture ratio of the slits in the vertical striped filter 40 on the side of the observer and the aperture ratio of the slits in the vertical striped filter 5 on the side of the light source from differing from each other.

As described in the foregoing, in the present invention, a grid-shaped vertical striped filter having a lot of slits arranged therein is located between a display panel and a light source, and the aperture ratio of slits in a vertical striped filter on the side of a observer ahead of the display panel and the aperture ratio of slits in the vertical striped filter on the side of the light source are suitably designed, thereby to make it possible to simultaneously satisfy the conditions under which the maximum illuminance is obtained and the conditions under which there is no crosstalk region even when an LCD panel in which the aperture ratio of pixels is not less than 50% is used.

Furthermore, it is possible to make a crosstalk region equal to or smaller than the conventional one and at the same time, make a region where three-dimensional images can be viewed at the maximum illuminance larger than the conventional one.

Additionally, the whole of the range in which images corresponding to the left and right eyes can be seen outside the range in which three-dimensional images can be viewed at the maximum illuminance can be considered as a crosstalk region so that the whole illuminance is not changed when the observer is moved rightward or leftward.

In the present invention, particularly if surfaces, on the side of a light source, of light screening portions in a vertical striped filter on the side of the light source are composed of a material having a high index of reflection, light incident on the light screening portions is introduced into light transmitting portions in the vertical striped filter on the side of the light source while being repeatedly reflected toward the light source and further reflected from a reflecting surface of the light source, thereby to make it possible to increase the utilization factor of the light to increase the illuminance in a position for view.

Furthermore, in the present invention, particularly if surfaces, on the side of an LCD panel, of the light screening portions in the vertical striped filter on the side of the light source are composed of a material having a low index of reflection, light reflected from the surface of the LCD panel can be prevented from being further reflected from the surfaces, on the side of the LCD panel, of the light screening portions and irregularly incident on pixels in the LCD panel, thereby to make it possible to prevent adverse effects such as the muddiness of color or the decrease in contrast.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Three-dimensional display in which light passing through left eye pixels in a display panel and light passing through right eye pixels are emitted externally of the display panel toward an observer in a separated state, comprising:

an internal light source for emitting internal light in a plane shape;

a vertical striped filter having slits, transmitting the internal light from the internal light source, and barriers, screening the internal light emitted from the internal light source, alternately formed horizontally therein for bringing the internal light from the internal light source to a stripe shape, wherein the barriers in said vertical striped filter are constituted by a reflector which reflects the internal light toward said internal light source; and a display panel of a transmission type arranged on the light emission side of the vertical striped filter.

2. The three-dimensional display according to claim 1, wherein said barrier of said filter comprises a transparent substrate and said reflector thereon, said reflector formed of high reflection material.

3. The three dimensional display according to claim 2, wherein said reflector is stripe-shaped.

4. The three-dimensional display according to claim 1, wherein said barrier has a reflectance layer which absorbs light from outside.

5. The three-dimensional display according to claim 1, wherein each of said slits of said filter correspond to one of a) a pair of the left eye pixels and b) a pair of right eye pixels.

6. The three-dimensional display according to claim 1, wherein
said display panel is constituted by a liquid crystal display panel.

7. The three-dimensional display according to claim 1, wherein
said reflector constituting said barriers is composed of a material having a high index of reflection.

8. The three-dimensional display according to claim 1, wherein
the whole of said vertical striped filter is divided into a plurality of cycles in a vertical stripe shape, and the slits are so formed that slit pitches in each of the cycles are non-uniform, and the average of the slit pitches in the cycle takes an ideal value operated from a distance between the eyes of the observer and a pixel pitch in the display panel.

9. The three-dimensional display according to claim 1, wherein
anti-reflection coatings are formed on surfaces, on the light emission side, of the barriers in said vertical striped filter.

* * * * *